United States Patent
Liu et al.

(10) Patent No.: US 10,904,768 B2
(45) Date of Patent: Jan. 26, 2021

(54) METHOD AND DEVICE IN COMMUNICATION NODE FOR WIRELESS COMMUNICATION

(71) Applicant: SHANGHAI LANGBO COMMUNICATION TECHNOLOGY COMPANY LIMITED, Shanghai (CN)

(72) Inventors: Zheng Liu, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/411,163

(22) Filed: May 14, 2019

(65) Prior Publication Data

US 2019/0357054 A1 Nov. 21, 2019

(30) Foreign Application Priority Data

May 16, 2018 (CN) .......................... 2018 1 0468288

(51) Int. Cl.
*H04W 16/14* (2009.01)
*H04W 72/04* (2009.01)
*H04L 27/26* (2006.01)
*H04L 5/00* (2006.01)

(52) U.S. Cl.
CPC .......... *H04W 16/14* (2013.01); *H04L 5/0082* (2013.01); *H04L 5/0094* (2013.01); *H04L 27/2607* (2013.01); *H04W 72/0446* (2013.01)

(58) Field of Classification Search
CPC ...................................................... H04W 16/14
See application file for complete search history.

(56) References Cited

U.S. PATENT DOCUMENTS

| | | | |
|---|---|---|---|
| 2016/0278078 A1* | 9/2016 | Cheng | H04W 74/0808 |
| 2019/0028969 A1* | 1/2019 | Wang | H04W 52/02 |
| 2019/0268939 A1* | 8/2019 | Yang | H04W 72/042 |

* cited by examiner

*Primary Examiner* — Kevin M Cunningham
(74) *Attorney, Agent, or Firm* — Maschoff Brennan

(57) ABSTRACT

The disclosure discloses a method and device in a communication node for wireless communication. The communication node receives first information, and performs Q energy detections respectively in Q time sub-pools within a first sub-band, and if energy detected by each energy detection of the Q energy detections is lower than a first threshold, starts to transmit a first radio signal at a first time-instant; the first information is used to determine K candidate time-instant subsets; a target time-instant subset is one of the K candidate time-instant subsets, the first time-instant belongs to the target time-instant subset; a frequency-domain bandwidth of the first sub-band is used to determine the target time-instant subset out of the K candidate time-instant subsets, and frequency-domain resources occupied by the first radio signal belong to the first sub-band. The disclosure can improve access fairness.

20 Claims, 11 Drawing Sheets

| Candidate time-instant subsets | Candidate time-length subset | First reference time-instant | First candidate time-length set |
|---|---|---|---|
| { A +16 µs, A +25 µs, A +34 µs} | {16 µs, 25 µs, 34 µs} | A | {16 µs, 25 µs, 34 µs, 43 µs, 52 µs, 61 µs, 1 OFDM or DFT-s-OFDM symbols} |
| { A +25 µs, A +34 µs, A +43 µs} | {25 µs, 34 µs, 43 µs} | | |
| { A +34 µs, A +43 µs, A +52 µs, A +61 µs } | {34 µs, 43 µs, 52 µs, 61 µs } | | |
| { A +52 µs, A +61 µs, A +1 OFDMs or DFT-s-OFDM symbols (15 kHz subcarrier spacing)} | {52 µs, 61 µs, 1 OFDM or DFT-s-OFDM symbols (15 kHz subcarrier spacing)} | | |
| { A +34 µs, A +43 µs, A +52 µs, A +61 µs, A +1 OFDMs or DFT-s-OFDM symbols (15 kHz subcarrier spacing)} | {, 34 µs, 43 µs, 52 µs, 61 µs, 1 OFDM or DFT-s-OFDM symbols (15 kHz subcarrier spacing)} | | |

Fig. 7

| Whether it is within the Maximum Channel Occupation Time (MCOT) of the serving base station | Subcarrier spacing | First candidate time-length set |
|---|---|---|
| No | 15kHz | {16 µs, 25 µs, 34 µs, 43 µs, 52 µs, 61 µs, 1 OFDM or DFT-s-OFDM symbols} |
| Yes | 15kHz | {34 µs, 43 µs, 52 µs, 61 µs, 1 OFDM or DFT-s-OFDM symbols} |
| No | 30kHz | {16 µs, 25 µs, 1 OFDM or DFT-s-OFDM symbol, 1 OFDM or DFT-s-OFDM symbols +9 µs, 1 OFDM or DFT-s-OFDM symbols +18 µs, 1 OFDM or DFT-s-OFDM symbols +27 µs, 2 OFDMs or DFT-s-OFDM symbols} |
| No | 30kHz | {16 µs, 25 µs, 1 OFDM or DFT-s-OFDM symbols, 1 OFDM or DFT-s-OFDM symbols +9 µs, 1 OFDM or DFT-s-OFDM symbols +18 µs, 2 OFDMs or DFT-s-OFDM symbols} |
| Yes | 30kHz | {1 OFDM or DFT-s-OFDM symbols, 1 OFDM or DFT-s-OFDM symbols +9 µs, 1 OFDM or DFT-s-OFDM symbols +18 µs, 1 OFDM or DFT-s-OFDM symbols +27 µs, 2 OFDMs or DFT-s-OFDM symbols} |
| Yes | 30kHz | {1 OFDM or DFT-s-OFDM symbols, 1 OFDM or DFT-s-OFDM symbols +9 µs, 1 OFDM or DFT-s-OFDM symbols +18 µs, 2 OFDMs or DFT-s-OFDM symbols} |

Fig. 8

METHOD AND DEVICE IN COMMUNICATION NODE FOR WIRELESS COMMUNICATION

CROSS-REFERENCE TO RELATED APPLICATION

This application claims the priority benefit of Chinese Patent Application Serial Number 201810468288.3, filed on May 16, 2018, the full disclosure of which is incorporated herein by reference.

BACKGROUND

Technical Field

The disclosure relates to a transmitting method in wireless communication systems, and in particular to a method and device for transmission in unlicensed spectrums.

Related Art

The application scenarios of future wireless communication systems are increasingly diversified, and different application scenarios impose different performance requirements on the systems. In order to meet the different performance requirements of various application scenarios, at 3rd Generation Partner Project (3GPP) Radio Access Network (RAN) #72 plenary meeting, it was decided to conduct research on New Radio (NR) (or 5G). The Work Item (WI) of the New Radio (NR) was approved at 3GPP RAN #75 plenary meeting, to start standardizing NR.

In order to adapt to various application scenarios and meet different requirements, the research project of unlicensed spectrum access under NR has also passed on the 3GPP RAN #75 plenary meeting. The research project is expected to be completed in the R15 version, and then the WI is launched in the R16 version to standardize related technologies.

SUMMARY

In the Long Term Evolution (LTE) License Assisted Access (LAA) project, both scheduling-based uplink transmission and Autonomous Uplink (AUL) are supported. For both scheduling-based uplink transmission and AUL, in order to determine that the unlicensed spectrum is available prior to transmission, the user equipment needs to perform Listen Before Talk (LBT) on the unlicensed frequency domain. In AUL, in order to mitigate collisions, the starting time-instants of multiple different uplink AUL transmissions are supported. In the 5G NR, due to the increase of the carrier bandwidth, the LBT based on the sub-band smaller than the carrier bandwidth is being discussed to improve the resource utilization. Therefore, in the unauthorized access of the 5G NR, it is possible to simultaneously support the sub-band-based. LBT and carrier-based LBT.

The disclosure provides a solution to the design problem of the uplink transmission time-instant in the LBT of different bandwidths. The embodiments in the User Equipment (UE) of the disclosure and the features in the embodiments may be applied to the base station without conflict, and vice versa. Further, the embodiments in the disclosure and the features in the embodiments may be arbitrarily combined with each other without conflict.

The disclosure discloses a method in a first-typecommunication node for wireless communication, comprising:

receiving first information;

performing Q energy detections respectively in Q time sub-pools within a first sub-band, wherein the Q is a positive integer greater than 1;

if the energy detected by each energy detection of the Q energy detections is lower than a first threshold, starting to transmit a first radio signal at a first time-instant;

wherein the first information is used to determine K candidate time-instant subsets, each candidate time-instant subset of the K candidate time-instant subsets comprises a positive integer number of candidate time-instants, the K is a positive integer greater than 1; a target time-instant subset is one of the K candidate time-instant subsets, the first time-instant belongs to the target time-instant subset; a frequency domain bandwidth of the first sub-band is used to determine the target time-instant subset out of the K candidate time-instant subsets, the frequency domain resources occupied by the first radio signal belong to the first sub-band; the first information is transmitted through an air interface.

In one embodiment, determining the target time-instant subset out of the K candidate time-instant subsets by using a frequency domain bandwidth of the first sub-band guarantees the independent configuration of a candidate transmission starting time-instant of an uplink transmission of the LBT based on different bandwidths, increasing flexibility, and reducing the probability of collisions.

In one embodiment, determining the target time-instant subset out of the K candidate time-instant subsets by using a frequency domain bandwidth of the first sub-band guarantees a fair access probability of the LBT based on different bandwidths or access probability based on business needs.

According to an aspect of the disclosure, the above method is characterized by further including:

receiving second information;

wherein the second information is used to determine a frequency domain bandwidth of the first sub-band, and the second information is transmitted through the air interface.

According to an aspect of the disclosure, the above method is characterized in that a length of a time interval between any one candidate time-instant within the K candidate time-instant subsets and a first reference time-instant belongs to a first candidate time-length set, the K candidate time-instant subsets respectively correspond to K candidate time-length subsets, the lengths of time intervals between candidate time-instants in any one of the K candidate time-instant subsets and the first reference time-instant constitute a candidate time-length subset of the K candidate time-length subsets corresponding to the any one of the K candidate time-instant subsets; and the first information is used to indicate the K candidate time-length subsets in the first candidate time-length set.

According to an aspect of the disclosure, the above method is characterized in that at least one of {an amount of candidate time lengths in the first candidate time-length set, the distribution of candidate time lengths in the first candidate time-length set} is related to a subcarrier spacing of a subcarrier included in frequency domain resources occupied by the first radio signal.

According to an aspect of the disclosure, the above method is characterized by further comprising:

receiving a first signaling;

wherein the first signaling is used to determine at least one of frequency domain resources occupied by the first radio signal or time domain resources occupied by the first radio signal, and the first signaling is transmitted through the air interface.

According to an aspect of the disclosure, the above method is characterized in that the first radio signal successively occupies a part of a multi-carrier symbol and a positive integer number of complete multi-carrier symbol(s) in time domain, and the signal transmitted in the part of the multi-carrier symbol occupied by the first radio signal is a cyclic extension of the signal transmitted in an earliest complete multi-carrier symbol occupied by the first radio signal.

The disclosure discloses a method in a second-type communication node for wireless communication, comprising:
 transmitting first information;
 receiving a first radio signal;
 wherein the first information is used to determine K candidate time-instant subsets, each candidate time-instant subset of the K candidate time-instant subsets comprises a positive integer number of candidate time-instants, the K is a positive integer greater than 1; a target time-instant subset is one of the K candidate time-instant subsets, the transmission starting time-instant of the first radio signal is a first time-instant, the first time-instant belongs to the target time-instant subset; a frequency domain bandwidth of the first sub-band is used to determine the target time-instant subset out of the K candidate time-instant subsets, the frequency domain resources occupied by the first radio signal belong to the first sub-band; the first information is transmitted through an air interface.

According to an aspect of the disclosure, the above method is characterized by further comprising:
 transmitting second information;
 wherein the second information is used to determine a frequency domain bandwidth of the first sub-band, and the second information is transmitted through the air interface.

According to an aspect of the disclosure, the above method is characterized in that a length of a time interval between any one candidate time-instant within the K candidate time-instant subsets and a first reference time-instant belongs to a first candidate time-length set, the K candidate time-instant subsets respectively correspond to K candidate time-length subsets, the lengths of time intervals between candidate time-instants in any one of the K candidate time-instant subsets and the first reference time-instant constitute a candidate time-length subset of the K candidate time-length subsets corresponding to the any one of the K candidate time-instant subsets; and the first information is used to indicate the K candidate time-length subsets in the first candidate time-length set.

According to an aspect of the disclosure, the above method is characterized in that at least one of {an amount of candidate time lengths in the first candidate time-length set, the distribution of candidate time lengths in the first candidate time-length set} is related to a subcarrier spacing of a subcarrier included in frequency domain resources occupied by the first radio signal.

According to an aspect of the disclosure, the above method is characterized by further comprising:
 transmitting a first signaling;
 wherein the first signaling is used to determine at least one of frequency domain resources occupied by the first radio signal or time domain resources occupied by the first radio signal, and the first signaling is transmitted through the air interface.

According to an aspect of the disclosure, the above method is characterized in that the first radio signal successively occupies a part of a multi-carrier symbol and a positive integer number of complete multi-carrier symbol(s) in time domain, and the signal transmitted in the part of the multi-carrier symbol occupied by the first radio signal is a cyclic extension of the signal transmitted in the earliest complete multi-carrier symbol occupied by the first radio signal.

The disclosure discloses a first-type communication node device for wireless communication, comprising:
 a first receiver to receive first information;
 a second receiver to perform Q energy detections respectively in Q time sub-pools within a first sub-band, wherein the Q is a positive integer greater than 1;
 a first transmitter if the energy detected by each energy detection of the Q energy detections is lower than a first threshold, to start to transmit a first radio signal at a first time-instant;
 wherein the first information is used to determine K candidate time-instant subsets, each candidate time-instant subset of the K candidate time-instant subsets comprises a positive integer number of candidate time-instants, the K is a positive integer greater than 1; a target time-instant subset is one of the K candidate time-instant subsets, the first time-instant belongs to the target time-instant subset; a frequency domain bandwidth of the first sub-band is used to determine the target time-instant subset out of the K candidate time-instant subsets, the frequency domain resources occupied by the first radio signal belong to the first sub-band; the first information is transmitted through an air interface.

According to an aspect of the disclosure, the first-type communication node device is characterized in that the first receiver receives second information; wherein the second information is used to determine a frequency domain bandwidth of the first sub-band, and the second information is transmitted through the air interface.

According to an aspect of the disclosure, the first-type communication node device is characterized in that a length of a time interval between any one candidate time-instant within the K candidate time-instant subsets and a first reference time-instant belongs to a first candidate time-length set, the K candidate time-instant subsets respectively correspond to K candidate time-length subsets, the lengths of time intervals between candidate time-instants in any one of the K candidate time-instant subsets and the first reference time-instant constitute a candidate time-length subset of the K candidate time-length subsets corresponding to the any one of the K candidate time-instant subsets; and the first information is used to indicate the K candidate time-length subsets in the first candidate time-length set.

According to an aspect of the disclosure, the first-type communication node device is characterized in that at least one of {an amount of candidate time lengths in the first candidate time-length set, the distribution of candidate time lengths in the first candidate time-length set} is related to a subcarrier spacing of a subcarrier included in frequency domain resources occupied by the first radio signal.

According to an aspect of the disclosure, the first-type communication node device is characterized in that the first receiver receives a first signaling; wherein the first signaling is used to determine at least one of {frequency domain resources occupied by the first radio signal, time domain resources occupied by the first radio signal}, and the first signaling is transmitted through the air interface.

According to an aspect of the disclosure, the first-type communication node device is characterized in that the first radio signal successively occupies a part of a multi-carrier symbol and a positive integer number of complete multi-carrier symbol(s) in time domain, and the signal transmitted in the part of the multi-carrier symbol occupied by the first radio signal is a cyclic extension of the signal transmitted in the earliest complete multi-carrier symbol occupied by the first radio signal.

The disclosure discloses a second-type communication node device for wireless communication, comprising:

a second transmitter to transmit first information;

a third receiver to receive a first radio signal;

wherein the first information is used to determine K candidate time-instant subsets, each candidate time-instant subset of the K candidate time-instant subsets comprises a positive integer number of candidate time-instants, the K is a positive integer greater than 1; a target time-instant subset is one of the K candidate time-instant subsets, the transmission starting time-instant of the first radio signal is a first time-instant, the first time-instant belongs to the target time-instant subset; a frequency domain bandwidth of the first sub-band is used to determine the target time-instant subset out of the K candidate time-instant subsets, the frequency domain resources occupied by the first radio signal belong to the first sub-band; the first information is transmitted through an air interface.

According to an aspect of the disclosure, the second-type communication node device is characterized in that the second transmitter transmits second information; wherein the second information is used to determine a frequency domain bandwidth of the first sub-band, and the second information is transmitted through the air interface.

According to an aspect of the disclosure, the second-type communication node device is characterized in that a length of a time interval between any one candidate time-instant within the K candidate time-instant subsets and a first reference time-instant belongs to a first candidate time-length set, the K candidate time-instant subsets respectively correspond to K candidate time-length subsets, the lengths of time intervals between candidate time-instants in any one of the K candidate time-instant subsets and the first reference time-instant constitute a candidate time-length subset of the K candidate time-length subsets corresponding to the any one of the K candidate time-instant subsets; and the first information is used to indicate the K candidate time-length subsets in the first candidate time-length set.

According to an aspect of the disclosure, the second-type communication node device is characterized in that at least one of {an amount of candidate time lengths in the first candidate time-length set, the distribution of candidate time lengths in the first candidate time-length set} is related to a subcarrier spacing of a subcarrier included in frequency domain resources occupied by the first radio signal.

According to an aspect of the disclosure, the second-type communication node device is characterized in that the second transmitter transmits a first signaling; wherein the first signaling is used to determine at least one of {frequency domain resources occupied by the first radio signal, time domain resources occupied by the first radio signal}, and the first signaling is transmitted through the air interface According to an aspect of the disclosure, the second-type communication node device is characterized in that the first radio signal successively occupies a part of a multi-carrier symbol and a positive integer number of complete multi-carrier symbol(s) in time domain, and the signal transmitted in the part of the multi-carrier symbol occupied by the first radio signal is a cyclic extension of the signal transmitted in the earliest complete multi-carrier symbol occupied by the first radio signal.

In one embodiment, the method according to the disclosure has the following advantages:

the method according to the disclosure provides a possibility for the network side to flexibly configure a candidate transmission starting time-instant in the AUL according to the bandwidth of the LBT or the type of the LBT, so that the network side can adjust the access probability of the uplink AUL according to service distribution or service demand, increasing configuration flexibility and resource utilization;

the method according to the disclosure avoids the problem that the broadband LBT (or carrier level LBT) may have a low access probability due to blocking of the sub-band LBT, and ensures fair unlicensed spectrum access.

BRIEF DESCRIPTION OF THE DRAWINGS

Other features, objects and advantages of the disclosure will become more apparent from the detailed description of non-restrictive embodiments taken in conjunction with the following drawings.

FIG. 7 is a schematic diagram illustrating a relationship between K candidate time-instant subsets and K candidate time-length subsets according to an embodiment of the disclosure.

FIG. 8 is a schematic diagram illustrating a relationship between a first candidate time-length set and a subcarrier spacing of a subcarrier included in frequency domain resources occupied by a first radio signal according to an embodiment of the disclosure.

DESCRIPTION OF THE EMBODIMENTS

The technical schemes of the disclosure will be further described in details below with reference to the accompanying drawings. It should be noted that the embodiments of the disclosure and the features in the embodiments may be combined with each other without conflict.

Embodiment 1

Figure 1:
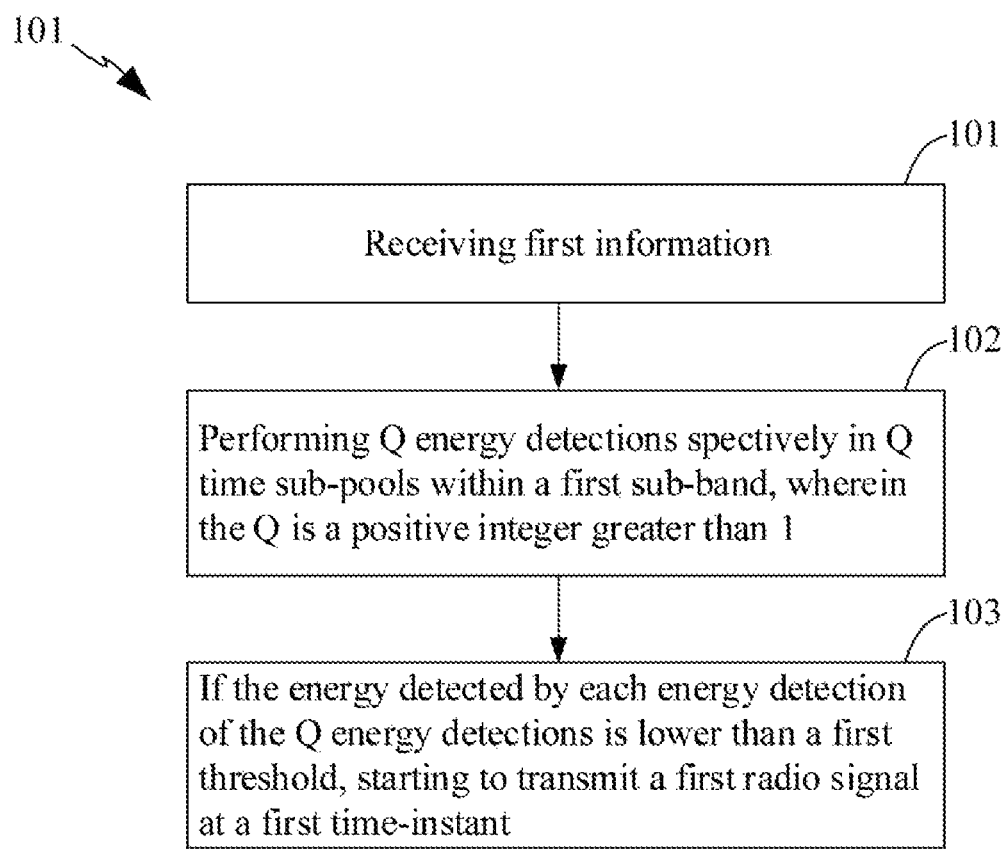
FIG. 1 is a flow chart illustrating transmission of first information, Q energy detections and a first radio signal according to an embodiment of the disclosure.

Embodiment 1 is a flow chart illustrating transmission of first information, Q energy detections and a first radio signal according to one embodiment of the disclosure, as shown in FIG. 1. In FIG. 1, each block represents a step.

In Embodiment 1, the first-type communication node in the disclosure first receives the first information in step 101; then performs Q energy detections respectively in Q time sub-pools within a first sub-band, in step 102, wherein the Q is a positive integer greater than 1; if the energy detected by each energy detection of the Q energy detections is lower than a first threshold, starts to transmit a first radio signal at a first time-instant in step 103; wherein the first information is used to determine K candidate time-instant subsets, each candidate time-instant subset of the K candidate time-instant subsets comprises a positive integer number of candidate time-instants, the K is a positive integer greater than 1; a target time-instant subset is one of the K candidate time-instant subsets, the first time-instant belongs to the target time-instant subset; a frequency domain bandwidth of the first sub-band is used to determine the target time-instant subset out of the K candidate time-instant subsets, the frequency domain resources occupied by the first radio signal belong to the first sub-band; the first information is transmitted through an air interface.

In one embodiment, the first-type communication node in the disclosure further receives second information, wherein the second information is used to determine a frequency domain bandwidth of the first sub-band, and the second information is transmitted through the air interface.

In one embodiment, a length of a time interval between any one candidate time-instant within the K candidate time-instant subsets and a first reference time-instant belongs to a first candidate time-length set, the K candidate time-instant subsets respectively correspond to K candidate time-length subsets, the lengths of time intervals between candidate time-instants in any one of the K candidate time-instant subsets and the first reference time-instant constitute a candidate time-length subset of the K candidate time-length subsets corresponding to the any one of the K candidate time-instant subsets; and the first information is used to indicate the K candidate time-length subsets in the first candidate time-length set.

In one embodiment, a length of a time interval between any one candidate time-instant within the K candidate time-instant subsets and a first reference time-instant belongs to a first candidate time-length set, the K candidate time-instant subsets respectively correspond to K candidate time-length subsets, the lengths of time intervals between candidate time-instants in any one of the K candidate time-instant subsets and the first reference time-instant constitute a candidate time-length subset of the K candidate time-length subsets corresponding to the any one of the K candidate time-instant subsets; and the first information is used to indicate the K candidate time-length subsets in the first candidate time-length set; at least one of {an amount of candidate time lengths in the first candidate time-length set, the distribution of candidate time lengths in the first candidate time-length set} is related to a subcarrier spacing of a subcarrier included in frequency domain resources occupied by the first radio signal.

In one embodiment, the first-type communication node in the disclosure further receives a first signaling; wherein the first signaling is used to determine at least one of {frequency domain resources occupied by the first radio signal, time domain resources occupied by the first radio signal}, and the first signaling is transmitted through the air interface;

In one embodiment, the first radio signal successively occupies a part of a multi-carrier symbol and a positive integer number of complete multi-carrier symbol(s) in time domain, and the signal transmitted in the part of the multi-carrier symbol occupied by the first radio signal is a cyclic extension of the signal transmitted in the earliest complete multi-carrier symbol occupied by the first radio signal.

In one embodiment, the first information is transmitted through a higher-layer signaling.

In one embodiment, the first information is transmitted through a physical-layer signaling.

In one embodiment, the first information includes all or part of a higher-layer signaling.

In one embodiment, the first information includes all or part of a physical-layer signaling.

In one embodiment, the first information includes all or part of an Information Element (IE) in a Radio Resource Control (RRC) signaling.

In one embodiment, the first information includes all or part of fields in an Information Element (IE) in a Radio Resource Control (RRC) signaling.

In one embodiment, the first information is transmitted through a Physical Broadcast Channel (PBCH).

In one embodiment, the first information includes one or more fields in a Master Information Block (MIB).

In one embodiment, the first information is transmitted through a Downlink Shared Channel (DL-SCH).

In one embodiment, the first information is transmitted through a Physical Downlink Shared Channel (PDSCH).

In one embodiment, the first information includes one or more fields in a System Information Block (SIB).

In one embodiment, the first information includes one or more fields in Remaining System Information (RMSI).

In one embodiment, the first information is broadcast.

In one embodiment, the first information is unicast.

In one embodiment, the first information is cell specific.

In one embodiment, the first information is UE-specific.

In one embodiment, the first information is transmitted through a Physical Downlink Control Channel (PDCCH).

In one embodiment, the first information is transmitted by a Physical Downlink Control Channel (PDCCH) scrambled by a Common Control Radio Network Temporary Identifier (CC-RNTI).

In one embodiment, the first information is transmitted through an unlicensed spectrum.

In one embodiment, the first information includes all or part of fields of a Downlink Control Information (DCI) signaling.

In one embodiment, the first information is used to determine the K candidate time-instant subsets, indicating that: the first information, the first-type communication node is used to determine the K candidate time-instant subsets.

In one embodiment, the first information is used to determine the K candidate time-instant subsets, indicating that: the first information is used to explicitly indicate the K candidate time-instant subsets.

In one embodiment, the first information is used to determine the K candidate time-instant subsets, indicating that: the first information is used to implicitly indicate the K candidate time-instant subsets.

In one embodiment, the first information is used to determine the K candidate time-instant subsets, indicating that: the first information is used to directly indicate the K candidate time-instant subsets.

In one embodiment, the first information is used to determine the K candidate time-instant subsets, indicating that: the first information is used to indirectly indicate the K candidate time-instant subsets.

In one embodiment, each of the Q energy detections indicates that: the first-type communication node monitors received power in a corresponding time sub-pool of the Q time sub-pools.

In one embodiment, each of the Q energy detections indicates that: the first-type communication node monitors received energy in a corresponding time sub-pool of the Q time sub-pools.

In one embodiment, each of the Q energy detections indicates that: the first-type communication node senses all radio signals on the sub-band in a corresponding time sub-pool of the Q time sub-pools to obtain received power.

In one embodiment, each of the Q energy detections indicates that: the first-type communication node senses all radio signals on the sub-band in a corresponding time sub-pool of the Q time sub-pools to obtain received energy.

In one embodiment, each of the Q energy detections is implemented by a method defined in section 15 of 3GPP TS36.213.

In one embodiment, each of the Q energy detections is implemented by an energy detection method in an LTE LAA.

In one embodiment, each of the Q energy detections is energy detection in a Listen Before Talk (LBT).

In one embodiment, each of the Q energy detections is implemented by an energy detection method in WiFi.

In one embodiment, each of the Q energy detections is implemented by measuring a Received Signal Strength Indication (RSSI).

In one embodiment, the first sub-band is deployed in an unlicensed spectrum.

In one embodiment, the Q energy detections are detected in a unit of dBm (millimeters).

In one embodiment, the Q energy detections are detected in a unit of milliwatts.

In one embodiment, the Q energy detections are detected in a unit of joules.

In one embodiment, the first-type communication node performs X energy detections in addition to the Q energy detections in the first sub-band prior to transmitting the first radio signal, the energy detected by each of the X energy detections is not lower than the first threshold, and the X is a positive integer.

In one embodiment, the first-type communication node performs X energy detections in addition to the Q energy detections in the first sub-band prior to transmitting the first radio signal and subsequent to the last transmission, the energy detected by each of the X energy detections is not lower than the first threshold, and the X is a positive integer.

In one embodiment, only the Q energy detections are performed in the first sub-band prior to transmitting the first radio signal and subsequent to the last transmission.

In one embodiment, the first threshold is in a unit of dBm (millimeters).

In one embodiment, the first threshold is in a unit of milliwatts.

In one embodiment, the first threshold is in a unit of joules.

In one embodiment, the first threshold is predefined.

In one embodiment, the first threshold is fixed.

In one embodiment, the first threshold is configurable.

In one embodiment, the first threshold is related to the bandwidth of the first sub-band.

In one embodiment, the first threshold is determined by a bandwidth of the first sub-band through a specific mapping relationship.

In one embodiment, the first threshold is determined by a bandwidth of the first sub-band through a specific mapping function.

In one embodiment, the first threshold is set autonomously by the first-type communication node within a given range.

In one embodiment, the first threshold is in section 15.2.3 of 3GPP TS36.213 (v15.0.0).

In one embodiment, the first threshold is in section 15.2.3.1 of 3GPP TS36.213 (v15.0.0).

In one embodiment, the first sub-band is a carrier.

In one embodiment, the first sub-band is a Bandwidth Part (BWP).

In one embodiment, the first sub-band is part of a carrier.

In one embodiment, the first sub-band is a sub-band.

In one embodiment, the first sub-band consists of a positive integer number of subcarriers that are continuous in the frequency domain.

In one embodiment, the bandwidth of the first sub-band is equal to 20 MHz.

In one embodiment, the bandwidth of the first sub-band is equal to 10 MHz.

In one embodiment, the bandwidth of the first sub-band is equal to 2.16 GHz.

In one embodiment, the first sub-band consists of frequency domain resources occupied by a positive integer number of Physical Resource Blocks (PRBs) in a frequency domain at a given Subcarrier Spacing (SCS).

In one embodiment, any two of the Q time sub-pools have the same time length.

In one embodiment, two of the Q time sub-pools have unequal time lengths.

In one embodiment, one of the Q time sub-pools has a time sub-pool of 16 microseconds.

In one embodiment, the earliest one of the Q time sub-pools has a different time length from other time sub-pools.

In one embodiment, any two of the Q time sub-pools are orthogonal in time.

In one embodiment, the Q time sub-pools occupy continuous time domain resources.

In one embodiment, any two of the Q time sub-pools occupy discontinuous time domain resources.

In one embodiment, any one of the Q time sub-pools occupies continuous time domain resources.

In one embodiment, the Q time sub-pools are listening time in a Cat 4 (Category 4) LBT.

In one embodiment, the Q time sub-pools include a defer time slot and a back-off time slot in a Cat 4 (Category 4) LBT.

In one embodiment, the first radio signal is transmitted through an Uplink Shared Channel (UL-SCH).

In one embodiment, the first radio signal is transmitted through a Physical Uplink Shared Channel (PUSCH).

In one embodiment, the first radio signal is obtained after all or a part of the bits of a Transport Block (TB) are sequentially subjected to transport block Cyclic Redundancy Check (CRC) addition, code block segmentation, code block CRC addition, rate matching, concatenation, scrambling, a modulation mapper, a layer mapper, precoding, a resource element mapper, and baseband signal generation.

In one embodiment, the first radio signal is obtained after all or a part of the bits of a Transport Block (TB) are sequentially subjected to transport block Cyclic Redundancy Check (CRC) addition, code block segmentation, code block CRC addition, rate matching, concatenation, scrambling, a modulation mapper, a layer mapper, transform precoding, precoding, a resource element mapper, and baseband signal generation.

In one embodiment, the first radio signal is obtained after all or a part of the bits of a positive integer number of Code Blocks (CBs) are sequentially subjected to code block CRC addition, rate matching, concatenation, scrambling, a modulation mapper, a layer mapper, transform precoding, precoding, a resource element mapper, and baseband signal generation.

In one embodiment, the first radio signal is obtained after all or a part of the bits of a positive integer number of Code Blocks (CBs) are sequentially subjected to code block CRC addition, rate matching, concatenation, scrambling, a modulation mapper, a layer mapper, precoding, a resource element mapper, and baseband signal generation.

In one embodiment, the first radio signal is transmitted by a method of Autonomous Uplink (AUL).

In one embodiment, each of the K candidate time-instant subsets includes more than one candidate time-instant.

In one embodiment, one of the K candidate time-instant subsets includes only one candidate time-instant.

In one embodiment, one of the K candidate time-instant subsets includes more than one candidate time-instant.

In one embodiment, the target time-instant subset includes more than one candidate time-instant.

In one embodiment, the target time-instant subset includes only one candidate time-instant.

In one embodiment, the target time-instant subset includes more than one candidate time-instant, and the first-type communication node selects the first time-instant in the target time-instant subset autonomously.

In one embodiment, the target time-instant subset includes more than one candidate time-instant, and the first-type communication node selects the first time-instant in the target time-instant subset randomly.

In one embodiment, the frequency domain bandwidth of the first sub-band is used to determine the target time-instant subset out of the K candidate time-instant subsets, indicating that: the frequency domain bandwidth of the first sub-band is used to determine the target time-instant subset out of the K candidate time-instant subsets according to a given mapping relationship.

In one embodiment, the frequency domain bandwidth of the first sub-band is used to determine the target time-instant subset out of the K candidate time-instant subsets, indicating that: the first-type communication node is used to determine the target time-instant subset out of the K candidate time-instant subsets at the frequency domain bandwidth in which the first sub-band performs Listen Before Talk (LBT).

In one embodiment, the frequency domain bandwidth of the first sub-band is used to determine the target time-instant subset out of the K candidate time-instant subsets, indicating that: the first-type communication node determines the target time-instant subset out of the K candidate time-instant subsets according to the frequency domain bandwidth in which the first sub-band performs Listen Before Talk (LBT).

In one embodiment, the frequency domain bandwidth of the first sub-band is used to determine the target time-instant subset out of the K candidate time-instant subsets, indicating that: the K candidate time-instant subsets correspond to a possible bandwidth of the K first sub-bands, respectively, and the first-type communication node determines the corresponding target time-instant subset according to the selected bandwidth of the first sub-band.

In one embodiment, the frequency domain bandwidth of the first sub-band is used to determine the target time-instant subset out of the K candidate time-instant subsets, indicating that: the K candidate time-instant subsets correspond to a possible frequency domain bandwidth of K LBTs, respectively, and the first-type communication node determines the corresponding target time-instant subset according to the selected frequency domain bandwidth of the LBT.

In one embodiment, the frequency domain bandwidth of the first sub-band is used to determine the target time-instant subset out of the K candidate time-instant subsets, indicating that: the first information in the disclosure is also used to indicate a possible bandwidth of the K first sub-bands corresponding to the K candidate time-instant subsets, respectively, and the first-type communication node determines the corresponding target time-instant subset according to the selected bandwidth of the first sub-band.

In one embodiment, the frequency domain bandwidth of the first sub-band is used to determine the target time-instant subset out of the K candidate time-instant subsets, indicating that: the K candidate time-instant subsets correspond to the type of the LBT (the sub-band LBT or a broadband or carrier-level LBT), respectively, and the first-type communication node determines the corresponding target time-instant subset according to the selected frequency domain bandwidth of the LBT.

In one embodiment, the frequency domain bandwidth of the first sub-band is used to determine the target time-instant subset out of the K candidate time-instant subsets, indicating that: the first information in the disclosure is used to indicate the type of the LBT (the sub-band LBT or a broadband or carrier-level LBT) corresponding to the K candidate time-instant subsets, respectively, and the first-type communication node determines the corresponding target time-instant subset according to the selected frequency domain bandwidth of the LBT.

In one embodiment, the frequency domain resources occupied by the first radio signal are all frequency domain resources in the first sub-band.

In one embodiment, the frequency domain resources occupied by the first radio signal are a part of the frequency domain resources in the first sub-band.

In one embodiment, the frequency domain resources occupied by the first radio signal are all the interlaces in the first sub-band.

In one embodiment, the frequency domain resources occupied by the first radio signal are a part of the interlaces in the first sub-band.

In one embodiment, the air interface is wireless.

In one embodiment, the air interface includes a wireless channel.

In one embodiment, the air interface is an interface between the second-type communication node and the first-type communication node.

In one embodiment, the air interface is a Uu interface.

Embodiment 2

Figure 2:
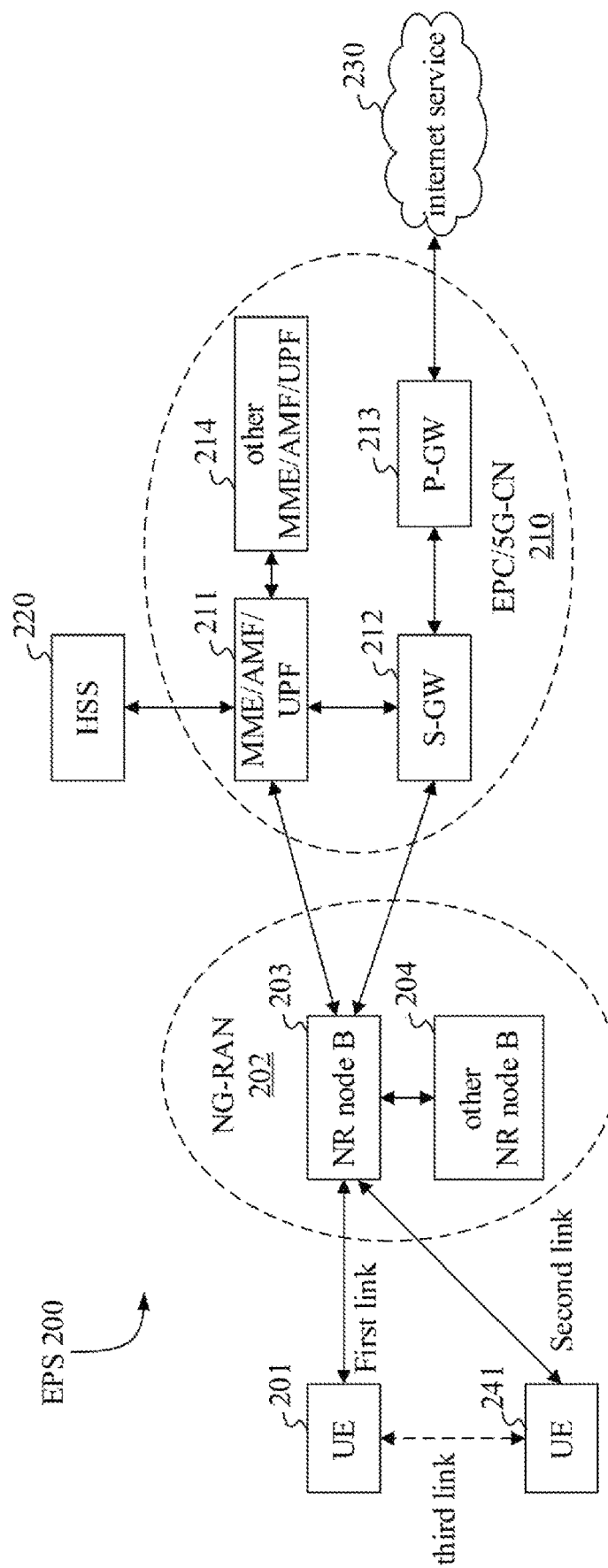
FIG. 2 is a schematic diagram illustrating a network architecture according to an embodiment of the disclosure.

Embodiment 2 illustrates a schematic diagram of a network architecture according to the present disclosure, as shown in FIG. 2. FIG. 2 illustrates a diagram of a system network architecture 200 of NR 5G, Long-Term Evolution (LTE), and Long-Term Evolution Advanced (LTE-A). The NR 5G or LTE network architecture 200 may be referred to as an Evolved Packet System (EPS) 200. The EPS 200 may include one or more of User Equipment (UE) 201, a Next Generation Radio Access Network (NG-RAN) 202, an Evolved Packet Core (EPC)/5G-Core Network (5G-CN) 210, a Home Subscriber Server (HSS) 220 and an Internet Service 230. The EPS may be interconnected with other access networks. For simple description, the entities/interfaces are not shown. As shown in the figure, the EPS provides packet switching services. Those skilled in the art are easy to understand that various concepts presented throughout the present disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a Transmitter Receiver Node (TRP) or other appropriate terms. In the NTN network, the gNB 203 may be a satellite, an aircraft or a ground base station relayed by satellite. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), Satellite Radios, Global Positioning Systems, multimedia devices, video devices, digital audio player (for example, MP3 players), cameras, games consoles, unmanned aerial vehicles, air vehicles, narrow-band Internet of Things equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The gNB 203 is connected to the EPC/5G-CN 210 via an S1/NG interface. The EPC/5G-CN 210 includes an MME/AMF/UPF 211, other MME/AMF/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IP IMSs) and Packet Switching Streaming Services (PSSs).

In one embodiment, the UE 201 corresponds to the first-type communication node device in the disclosure.

In one embodiment, the UE 201 supports transmissions in an unlicensed spectrum.

In one embodiment, the gNB 203 corresponds to the second-type communication node device in the disclosure.

In one embodiment, the gNB 203 supports transmission in an unlicensed spectrum.

Embodiment 3

Figure 3:
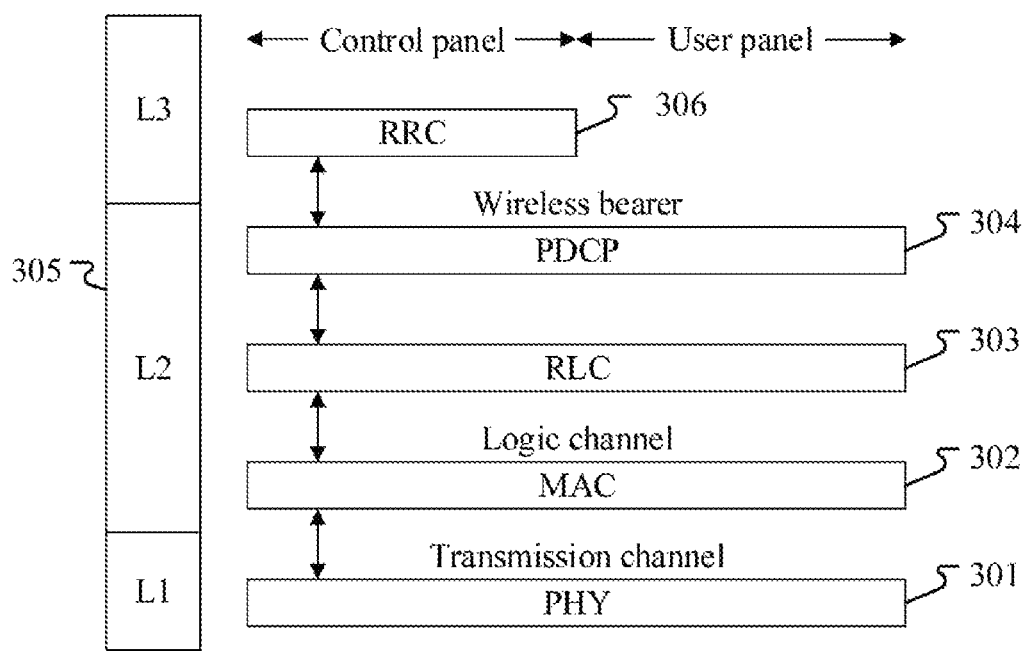
FIG. 3 is a schematic diagram illustrating a radio protocol architecture of a user plane and a control plane according to an embodiment of the disclosure.

Embodiment 3 is a schematic diagram illustrating a radio protocol architecture of a user plane and a control plane according to the disclosure, as shown in FIG. 3. FIG. 3 illustrates a schematic diagram of a radio protocol architecture of a user plane and a control plane. In FIG. 3, the radio protocol architecture of the first-type communication node device (UE) and the second-type communication node device (gNB or eNB or a satellite or aircraft in the NTN) is represented by three layers, which are a layer 1, a layer 2 and a layer 3 respectively. The layer 1 (L1) 301 is the lowest layer and performs signal processing functions of each PHY layer. The layer 1 is called PHY 301 in this paper. The layer 2 (L2) 305 is above the PHY 301, and is in charge of the link between the first-type communication node device and the second-type communication node device via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the first-type communication node device of the network side. Although not described in FIG. 3, the first-type communication node device may include several higher layers above the L2 305, such as a network layer (i.e. IP layer) terminated at a P-GW of the network side and an application layer terminated at the other side of the connection (i.e. a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for the first-type communication node device movement between the second-type communication node devices. The RLC sublayer 303 provides segmentation and reassembling of a higher-layer packet, retransmission of a lost packet, and reordering of a lost packet so as to compensate the disordered receiving caused by Hybrid Automatic Repeat Request (HARQ). The MAC sublayer 302 provides multiplexing between logical channels and transport channels. The MAC sublayer 302 is also responsible for allocating between the first-type communication node devices various radio resources (i.e., resource block) in a cell. The MAC sublayer 302 is also in charge of HARQ operation. In the control plane, the radio protocol architecture of the first-type communication node device and the second-type communication node device is almost the same as the radio protocol architecture in the user plane on the PHY 301 and the L2 305, but there is no header compression function for the control plane. The control plane also includes a Radio Resource Control (RRC) sublayer 306 in the layer 3 (L3). The RRC sublayer 306 is responsible for acquiring radio resources (i.e. radio bearer) and configuring the lower layers using an RRC signaling between the second-type communication node device and the first-type communication node device.

In one embodiment, the radio protocol architecture of FIG. 3 is applicable to the first-type communication node device in the disclosure.

In one embodiment, the radio protocol architecture of FIG. 3 is applicable to the second-type communication node device in the disclosure.

In one embodiment, the first information in the disclosure is generated in the RRC 306.

In one embodiment, the first information in the disclosure is generated in the MAC 302.

In one embodiment, the first information in the disclosure is generated by the PHY 301.

In one embodiment, the first radio signal in the disclosure is generated in the RRC 306.

In one embodiment, the first radio signal in the disclosure is generated by the MAC 302.

In one embodiment, the first radio signal in the disclosure is generated by the PHY 301.

In one embodiment, the Q energy detections in the disclosure are performed on the PHY 301.

In one embodiment, the second information in the disclosure is generated in the RRC 306.

In one embodiment, the second information in the disclosure is generated in the MAC 302.

In one embodiment, the second information in the disclosure is generated by the PHY 301.

In one embodiment, the first signaling in the disclosure is generated in the RRC 306.

In one embodiment, the first signaling in the disclosure is generated by the MAC 302.

In one embodiment, the first signaling in the disclosure is generated by the PHY 301.

Embodiment 4

Figure 4:
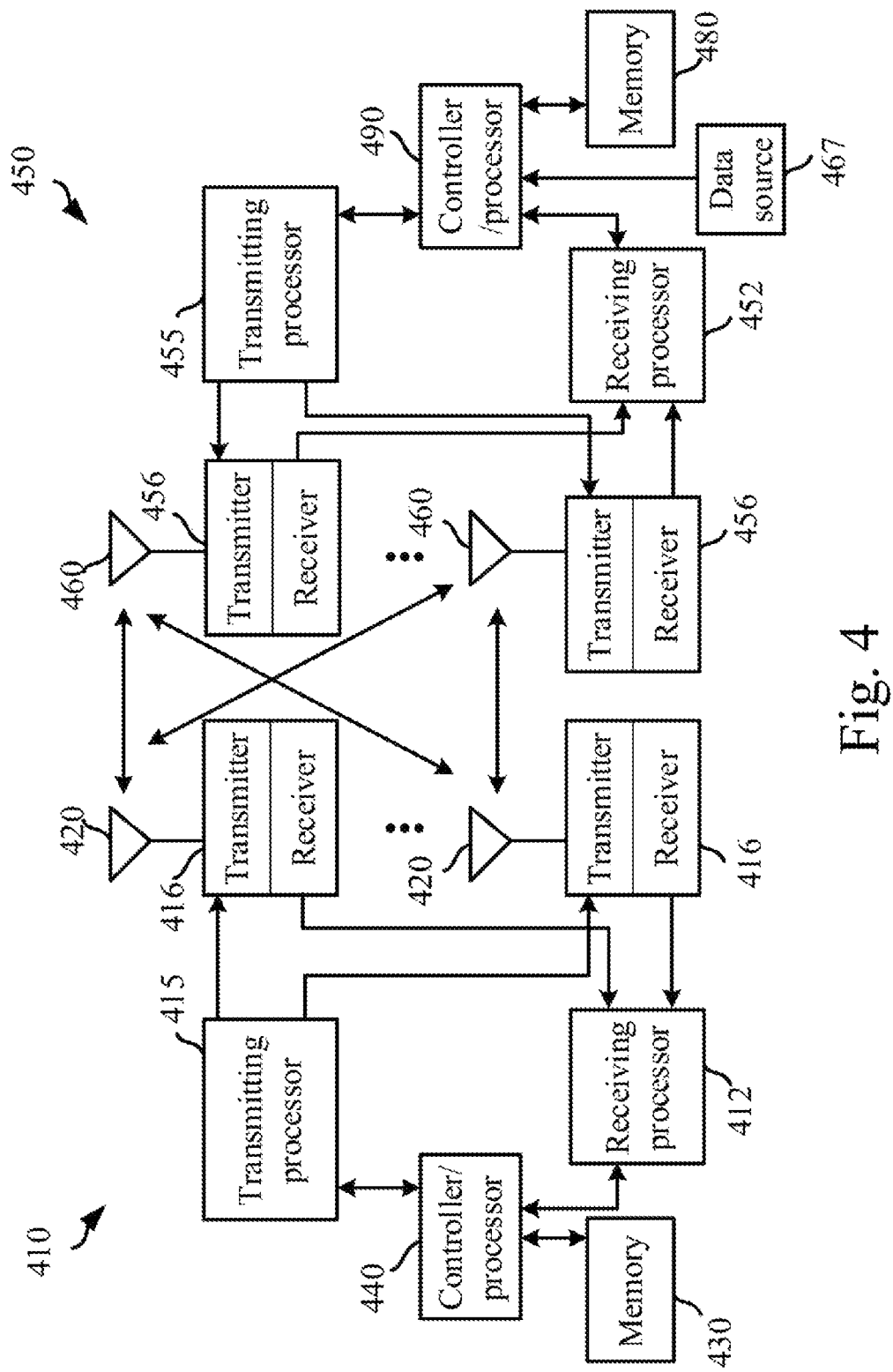
FIG. 4 is a schematic diagram illustrating base station equipment and user equipment according to an embodiment of the disclosure.

Embodiment 4 is a schematic diagram illustrating base station equipment and given user equipment according to the disclosure, as shown in FIG. 4. FIG. 4 is a block diagram of a gNB/eNB 410 in communication with a UE 450 in an access network.

The user equipment (UE 450) includes a controller/processor 490, a memory 480, a receiving processor 452, a transmitter/receiver 456, a transmitting processor 455 and a data source 467, and the transmitter/receiver 456 includes an antenna 460. Data source 467 provides an upper-layer packet to the controller/processor 490, which provides packet header compression and decompression, encryption and decryption, packet segmentation connection and reordering, and multiplexing and demultiplexing between the logical and transport channels for implementing the L2 layer protocol for the user plane and the control plane. The upper-layer packet may include data or control information, such as a Downlink Shared Channel (DL-SCH) or Uplink Shared Channel (UL-SCH). The transmitting processor 455 implements various signal transmission processing functions for the L1 layer (i.e., the physical layer) including coding, interleaving, scrambling, modulating, power control/allocation, precoding, physical layer control signaling generation, etc. The receiving processor 452 implements various signal receiving processing functions for the L1 layer (i.e., the physical layer) including decoding, deinterleaving, descrambling, demodulating, de-precoding, physical layer control signaling extraction, etc. The transmitter 456 is configured to convert the baseband signal provided by the transmitting processor 455 into a radio frequency signal and transmit the signal via the antenna 460. The receiver 456 is configured to convert the radio frequency signal received through the antenna 460 into a baseband signal and provide the signal to the receiving processor 452.

The base station equipment (410) may include a controller/processor 440, a memory 430, a receiving processor 412, a transmitter/receiver 416 and a transmitting processor 415, and the transmitter/receiver 416 includes an antenna 420. The upper-layer packet arrives at the controller/processor 440, which provides packet header compression and decompression, encryption and decryption, packet segmentation connection and reordering, and multiplexing and demultiplexing between the logical and transport channels for implementing the L2 layer protocol for the user plane and the control plane. The upper-layer packet may include data or control information, such as a DL-SCH or UL-SCH. The transmitting processor 415 implements various signal transmission processing functions for the L1 layer (i.e., the physical layer) including coding, interleaving, scrambling, modulating, power control/allocation, precoding, physical layer signaling (including synchronization signals, reference signals, etc.) generation, etc. The receiving processor 412 implements various signal receiving processing functions for the L1 layer (i.e., the physical layer) including decoding, deinterleaving, descrambling, demodulating, de-precoding, physical layer signaling extraction, etc. The transmitter 416 is configured to convert the baseband signal provided by the transmitting processor 415 into a radio frequency signal and transmit the signal via the antenna 420. The receiver 416 is configured to convert the radio frequency signal received through the antenna 420 into a baseband signal and provide the signal to the receiving processor 412.

In the Downlink (DL), the upper-layer packet (such as the first information and the second information in the disclosure) is provided to the controller/processor 440. The controller/processor 440 implements the function for the L2 layer. In the DL, the controller/processor 440 provides packet header compression, encryption, packet segmentation and reordering, multiplexing between the logical and transport channels, and radio resource allocation to the UE 450 based on various priority metrics. The controller/processor 440 is also responsible for HARQ operation, retransmission of lost packets, and signaling to the UE 450. For example, the first information and the second information in the disclosure are both generated in the controller/processor 440. The transmitting processor 415 implements various signal processing functions for the L1 layer (i.e., the physical layer), including coding, interleaving, scrambling, modulating, power control/allocation, precoding, and physical layer control signaling generation, etc. The modulation symbols are divided into parallel streams and each stream is mapped to a corresponding multi-carrier subcarrier and/or multi-carrier symbol, which is then mapped to the antenna 420 by the transmitting processor 415 via the transmitter 416 and is transmitted in the form of a radio frequency signal. The first information and the second information in the disclosure is mapped by the transmitting processor 415 onto the target air interface resources and is mapped to the antenna 420 via the transmitter 416 and is transmitted in the form of a radio frequency signal. At the receiving end, each receiver 456 receives a radio frequency signal through its respective antenna 460. Each receiver 456 recovers the baseband information modulated onto the radio frequency carrier and provides the baseband information to the receiving processor 452. The receiving processor 452 implements various signal receiving processing functions for the L1 layer. The signal receiving processing function includes receiving the physical layer signals of the first information and the second information in the disclosure, and performing Q energy detections in the disclosure, etc., performing demodulation based on various modulation schemes (such as Binary Phase Shift Keying (BPSK), Quadrature Phase Shift Keying (QPSK)) through the multi-carrier symbol(s) in the multi-carrier symbol stream, then scrambling, decoding and deinterleaving to recover data or control signals transmitted by the gNB 410 on the physical channel, and then providing the data and control signals to the controller/processor 490. The controller/processor 490 implements the L2 layer. The controller/processor 490 interprets the first information and the second information in the disclosure. The controller/processor may be associated with a memory 480 in which program codes and data are stored. The memory 480 may be referred to as a computer-readable medium.

In an uplink (UL) transmission, data source 467 is used to provide relevant configuration data of the signal to the controller/processor 490. The data source 467 represents all of the protocol layers above the L2 layer, and the first radio signal in the disclosure is generated at data source 467. The controller/processor 490 implements the L2 layer protocol for the user plane and the control plane by providing packet header compression, encryption, packet segmentation and reordering, and multiplexing between the logical and transport channels based on the configuration allocation of the gNB 410. The controller/processor 490 is also responsible for HARQ operation, retransmission of lost packets, and signaling to the gNB 410. The transmitting processor 455 implements various signal transmission processing functions for the L1 layer (i.e., the physical layer). The signal transmission processing functions include encoding, modulation, etc. The modulation symbols are divided into parallel streams, and each stream is mapped to a corresponding multi-carrier subcarrier and/or multi-carrier symbol for generating a baseband signal, and is then mapped to the antenna 460 by the transmitting processor 455 via the transmitter 456 and is transmitted in the form of a radio frequency signal. The signal of the physical layer (including the generation and transmission of the first radio signal in the disclosure) is generated by the transmitting processor 455. The receiver 416 receives a radio frequency signal through its respective antenna 420. Each receiver 416 recovers the baseband information modulated onto the radio frequency carrier and provides the baseband information to the receiving processor 412. The receiving processor 412 implements various signal receiving processing functions for the L1 layer (i.e., the physical layer), including receiving the first radio signal in the disclosure. The signal receiving processing function includes acquiring a multi-carrier symbol stream, then performing demodulation based on various modulation schemes on the multi-carrier symbol(s) in the multi-carrier symbol stream, then decoding to recover data or control signals originally transmitted by the gNB 450 on the physical channel, and then providing the data and/or control signals to the controller/processor 440. The receiving processor controller/processor 490 implements the L2 layer. The controller/processor may be associated with a memory 430 in which program codes and data are stored. The memory 430 may be referred to as a computer-readable medium.

In one embodiment, the UE 450 corresponds to the first-type communication node device in the disclosure.

In one embodiment, the gNB 410 corresponds to the second-type communication node device in the disclosure.

In one embodiment, the UE 450 device includes: at least one processor and at least one memory, wherein the at least one memory includes a computer program code; the at least one memory and the computer program code are configured to be used together with the at least one processor. The UE 450 device at least includes: receiving first information; performing Q energy detections respectively in Q time sub-pools within a first sub-band, wherein the Q is a positive integer greater than 1; if the energy detected by each energy detection of the Q energy detections is lower than a first threshold, starting to transmit a first radio signal at a first time-instant; wherein the first information is used to determine K candidate time-instant subsets, each candidate time-instant subset of the K candidate time-instant subsets comprises a positive integer number of candidate time-instants, the K is a positive integer greater than 1; a target time-instant subset is one of the K candidate time-instant subsets, the first time-instant belongs to the target time-instant subset; a frequency domain bandwidth of the first sub-band is used to determine the target time-instant subset out of the K candidate time-instant subsets, the frequency domain resources occupied by the first radio signal belong to the first sub-band; the first information is transmitted through an air interface.

In one embodiment, the UE 450 includes: a memory in which a computer-readable instruction program is stored, wherein the computer-readable instruction program generates an action when executed by the at least one processor. The action including: receiving first information; performing Q energy detections respectively in Q time sub-pools within a first sub-band, wherein the Q is a positive integer greater than 1; if the energy detected by each energy detection of the Q energy detections is lower than a first threshold, starting to transmit a first radio signal at a first time-instant; wherein the first information is used to determine K candidate time-instant subsets, each candidate time-instant subset of the K candidate time-instant subsets comprises a positive integer number of candidate time-instants, the K is a positive integer greater than 1; a target time-instant subset is one of the K candidate time-instant subsets, the first time-instant belongs to the target time-instant subset; a frequency domain bandwidth of the first sub-band is used to determine the target time-instant subset out of the K candidate time-instant subsets, the frequency domain resources occupied by the first radio signal belong to the first sub-band; the first information is transmitted through an air interface.

In one embodiment, the eNB 410 device includes: at least one processor and at least one memory, wherein the at least one memory includes a computer program code; the at least one memory and the computer program code are configured to be used together with the at least one processor. The eNB 410 device at least includes: transmitting first information; receiving a first radio signal; wherein the first information is used to determine K candidate time-instant subsets, each candidate time-instant subset of the K candidate time-instant subsets comprises a positive integer number of candidate time-instants, the K is a positive integer greater than 1; a target time-instant subset is one of the K candidate time-instant subsets, the transmission starting time-instant of the first radio signal is a first time-instant, the first time-instant belongs to the target time-instant subset; a frequency domain bandwidth of the first sub-band is used to determine the target time-instant subset out of the K candidate time-instant subsets, the frequency domain resources occupied by the first radio signal belong to the first sub-band; the first information is transmitted through an air interface.

In one embodiment, the eNB 410 includes: a memory in which a computer-readable instruction program is stored, wherein the computer-readable instruction program generates an action when executed by the at least one processor. The action including: transmitting first information; receiving a first radio signal; wherein the first information is used to determine K candidate time-instant subsets, each candidate time-instant subset of the K candidate time-instant subsets comprises a positive integer number of candidate time-instants, the K is a positive integer greater than 1; a target time-instant subset is one of the K candidate time-instant subsets, the transmission starting time-instant of the first radio signal is a first time-instant, the first time-instant belongs to the target time-instant subset; a frequency domain bandwidth of the first sub-band is used to determine the target time-instant subset out of the K candidate time-instant subsets, the frequency domain resources occupied by the first radio signal belong to the first sub-band; the first information is transmitted through an air interface.

In one embodiment, the receiver 456 (including the antenna 460), the receiving processor 452 and the controller/processor 490 are used to receive the first information in the disclosure.

In one embodiment, the receiver 456 (including the antenna 460), the receiving processor 452 and the controller/processor 490 are used to receive the second information in the disclosure.

In one embodiment, the receiver 456 (including the antenna 460) and the receiving processor 452 are used to perform the Q energy detections in the disclosure.

In one embodiment, the receiver 456 (including the antenna 460) and the receiving processor 452 are used to receive the first signaling in the disclosure.

In one embodiment, the transmitter 456 (including the antenna 460) and the transmitting processor 455 are used to transmit the first radio signal in the disclosure.

In one embodiment, the transmitter 416 (including the antenna 420), the transmitting processor 415, and the controller/processor 440 are used to transmit the first information in the disclosure.

In one embodiment, the transmitter 416 (including the antenna 420), the transmitting processor 415, and the controller/processor 440 are used to transmit the second information in the disclosure.

In one embodiment, the transmitter 416 (including the antenna 420) and the transmitting processor 415 are used to transmit the first signaling in the disclosure.

In one embodiment, the receiver 416 (including the antenna 420) and the receiving processor 412 are used to receive the first radio signal in the disclosure.

Embodiment 5

Figure 5:
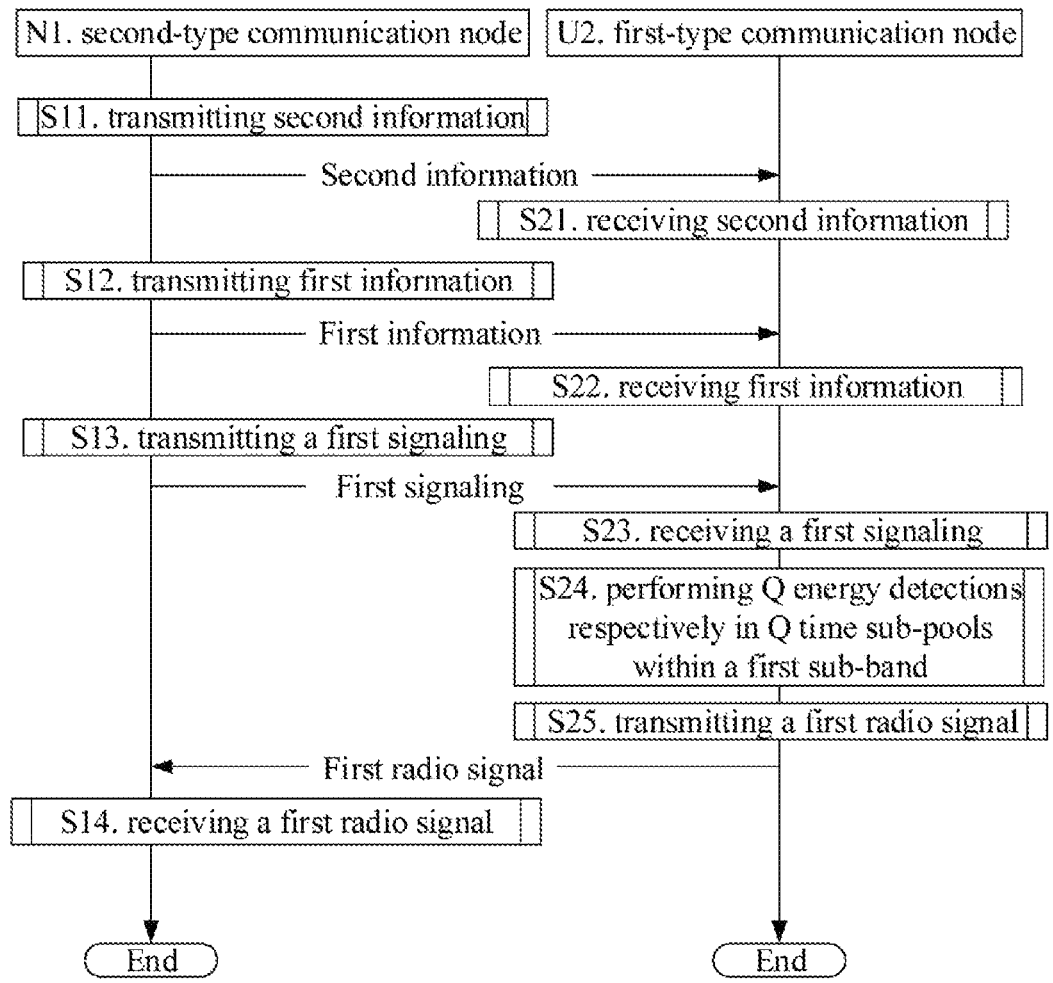
FIG. 5 is a flow chart illustrating transmission of a radio signal according to an embodiment of the disclosure.

Embodiment 5 is a flow chart illustrating transmission of a radio signal according to one embodiment of the disclosure, as shown in FIG. 5. In FIG. 5, the second-type communication node N1 is a maintenance base station of the serving cell of the second-type communication node U2.

For the second-type communication node N1, the second information is transmitted in step S11, the first information is transmitted in step S12, the first signaling is transmitted in step S13, and the first radio signal is received in step S14.

For the first-type communication node U2, the second information is received in step S21, the first information is received in step S22, the first signaling is received in step S23, Q energy detections are performed in Q time sub-pools within a first sub-band, respectively in step S14, and the first radio signal is transmitted in step S25.

In Embodiment 5, the first information is used to determine K candidate time-instant subsets, each candidate time-instant subset of the K candidate time-instant subsets comprises a positive integer number of candidate time-instants, the K is a positive integer greater than 1; a target time-instant subset is one of the K candidate time-instant subsets, the first time-instant belongs to the target time-instant subset; a frequency domain bandwidth of the first sub-band is used to determine the target time-instant subset out of the K candidate time-instant subsets, the frequency domain resources occupied by the first radio signal belong to the first sub-band; the second information is used to determine a frequency domain bandwidth of the first sub-band; the first signaling is used to determine at least one of {frequency domain resources occupied by the first radio signal, time domain resources occupied by the first radio signal}.

In one embodiment, a length of a time interval between any one candidate time-instant within the K candidate time-instant subsets and a first reference time-instant belongs to a first candidate time-length set, the K candidate time-instant subsets respectively correspond to K candidate time-length subsets, the lengths of time intervals between candidate time-instants in any one of the K candidate time-instant subsets and the first reference time-instant constitute a candidate time-length subset of the K candidate time-length subsets corresponding to the any one of the K candidate time-instant subsets; and the first information is used to indicate the K candidate time-length subsets in the first candidate time-length set.

In one embodiment, at least one of {an amount of candidate time lengths in the first candidate time-length set, the distribution of candidate time lengths in the first candidate time-length set} is related to a subcarrier interval between subcarriers included in frequency domain resources occupied by the first radio signal.

In one embodiment, the first radio signal successively occupies a part of a multi-carrier symbol and a positive integer number of complete multi-carrier symbol(s) in time domain, and the signal transmitted in the part of the multi-carrier symbol occupied by the first radio signal is a cyclic extension of the signal transmitted in the earliest complete multi-carrier symbol occupied by the first radio signal.

In one embodiment, the second information is used to determine a frequency domain bandwidth of the first sub-band, indicating that: the second information indicates the energy detection bandwidth in which Q energy detections are performed in the Q time sub-pools, respectively.

In one embodiment, the second information is used to determine a frequency domain bandwidth of the first sub-band, indicating that: the second information indicates the filter bandwidth in which Q energy detections are performed in the Q time sub-pools, respectively.

In one embodiment, the second information is used to determine a frequency domain bandwidth of the first sub-band, indicating that: the second information indicates the type of the LBT, and the type of the LBT includes a broadband LBT and a narrowband LBT.

In one embodiment, the second information is used to determine a frequency domain bandwidth of the first sub-band, indicating that: the second information indicates a relationship between a bandwidth of the LBT and a carrier bandwidth.

In one embodiment, the second information is used to determine a frequency domain bandwidth of the first sub-band, indicating that: the second information is used by the first-type communication node to determine the frequency domain bandwidth of the first sub-band.

In one embodiment, the second information is used to determine a frequency domain bandwidth of the first sub-band, indicating that: the second information is used to explicitly indicate the frequency domain bandwidth of the first sub-band.

In one embodiment, the second information is used to determine a frequency domain bandwidth of the first sub-band, indicating that: the second information is used to implicitly indicate the frequency domain bandwidth of the first sub-band.

In one embodiment, the second information is used to determine a frequency domain bandwidth of the first sub-band, indicating that: the second information is used to directly indicate the frequency domain bandwidth of the first sub-band.

In one embodiment, the second information is used to determine a frequency domain bandwidth of the first sub-band, indicating that: the second information is used to indirectly indicate the frequency domain bandwidth of the first sub-band.

In one embodiment, the second information is transmitted through a higher-layer signaling.

In one embodiment, the second information is transmitted through a physical-layer signaling.

In one embodiment, the second information includes all or part of a higher-layer signaling.

In one embodiment, the second information includes all or part of a physical-layer signaling.

In one embodiment, the second information is transmitted through a Physical Broadcast Channel (PBCH).

In one embodiment, the second information includes one or more fields in a Master Information Block (MIB).

In one embodiment, the second information is transmitted through a Downlink Shared Channel (DL-SCH).

In one embodiment, the second information is transmitted through a Physical Downlink Shared Channel (PDSCH).

In one embodiment, the first information includes one or more fields in a System Information Block (SIB).

In one embodiment, the first information includes one or more fields in Remaining System Information (RMSI).

In one embodiment, the second information includes all or part of a Radio Resource Control (RRC) signaling.

In one embodiment, the second information is broadcast.

In one embodiment, the second information is unicast.

In one embodiment, the second information is cell specific.

In one embodiment, the second information is UE-specific.

In one embodiment, the second information is transmitted through a Physical Downlink Control Channel (PDCCH).

In one embodiment, the second information includes all or part of fields of a Downlink Control Information (DCI) signaling.

In one embodiment, the second information is transmitted by a Physical Downlink Control Channel (PDCCH) scrambled by a Common Control Radio Network Temporary Identifier (CC-RNTI).

In one embodiment, the second information is transmitted through an unlicensed spectrum.

In one embodiment, the first signaling indicates the first reference time-instant.

In one embodiment, the first signaling is used to determine the frequency domain resources occupied by the first radio signal, indicating that: the first signaling indicates the first reference time-instant, the first-type communication node selects a candidate time length autonomously in a candidate time-length subset of the K candidate time-length subsets corresponding to the target time-instant subset, and the first-type communication node determines the time domain resources occupied by the first radio signal according to the first reference time-instant and the selected candidate time length.

In one embodiment, the frequency domain resources occupied by the first radio signal is the entire first sub-band.

In one embodiment, the first signaling is used to determine at least one of {frequency domain resources occupied by the first radio signal, time domain resources occupied by the first radio signal}, indicating that: the first signaling is used by the first-type communication node to determine at least one of {frequency domain resources occupied by the first radio signal, time domain resources occupied by the first radio signal}.

In one embodiment, the first signaling is used to determine at least one of {frequency domain resources occupied by the first radio signal, time domain resources occupied by the first radio signal}, indicating that: the first signaling is used to directly indicate at least one of {frequency domain resources occupied by the first radio signal, time domain resources occupied by the first radio signal}.

In one embodiment, the first signaling is used to determine at least one of {frequency domain resources occupied by the first radio signal, time domain resources occupied by the first radio signal}, indicating that: the first signaling is used to indirectly indicate at least one of {frequency domain resources occupied by the first radio signal, time domain resources occupied by the first radio signal}.

In one embodiment, the first signaling is used to determine at least one of {frequency domain resources occupied by the first radio signal, time domain resources occupied by the first radio signal}, indicating that: the first signaling is used to explicitly indicate at least one of {frequency domain resources occupied by the first radio signal, time domain resources occupied by the first radio signal}.

In one embodiment, the first signaling is used to determine at least one of {frequency domain resources occupied by the first radio signal, time domain resources occupied by the first radio signal}, indicating that: the first signaling is used to implicitly indicate at least one of {frequency domain resources occupied by the first radio signal, time domain resources occupied by the first radio signal}.

In one embodiment, the first signaling is all or part of a physical-layer signaling.

In one embodiment, the first signaling is all or part of a higher-layer signaling.

In one embodiment, the first signaling is all or part of an RRC signaling.

In one embodiment, the first signaling is transmitted through a Physical Downlink Control Channel (PDCCH).

In one embodiment, the first signaling includes all or part of fields of Downlink Control Information (DCI).

In one embodiment, the first signaling is received in a Common Search Space (CSS).

In one embodiment, the first signaling is received in a UE-specific Search Space (USS).

In one embodiment, the first signaling includes all or part of an uplink grant.

Embodiment 6

Figure 6:
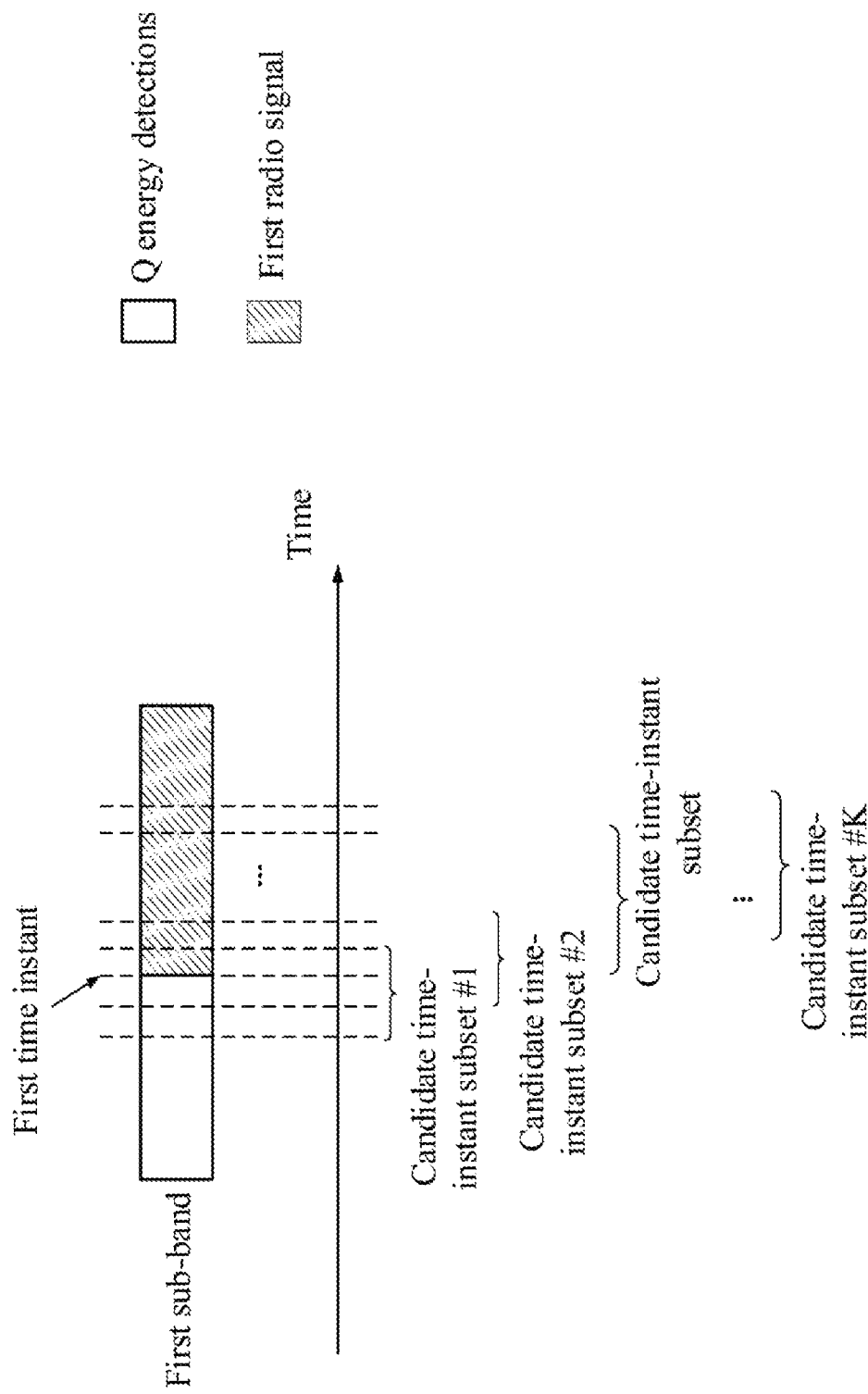
FIG. 6 is a schematic diagram illustrating K candidate time-instant subsets according to an embodiment of the disclosure.

Embodiment 6 is a schematic diagram illustrating K candidate time-instant subsets according to an embodiment of the disclosure. In FIG. 6, the horizontal axis represents time, the obliquely filled rectangle represents the first radio signal, and the unfilled rectangle represents Q energy detections.

In Embodiment 6, the transmission starting time-instant of the first radio signal in the disclosure is a first time-instant, each candidate time-instant subset of the K candidate time-instant subsets in the disclosure comprises a positive integer number of candidate time-instants, the K is a positive integer greater than 1; a target time-instant subset is one of the K candidate time-instant subsets, the first time-instant belongs to the target time-instant subset; a frequency domain bandwidth of the first sub-band to which Q energy detections belong is used to determine the target time-instant subset out of the K candidate time-instant subsets, the frequency domain resources occupied by the first radio signal belong to the first sub-band; the first information is transmitted through an air interface.

In one embodiment, a length of a time interval between any one candidate time-instant within the K candidate time-instant subsets and a first reference time-instant belongs to a first candidate time-length set, the K candidate time-instant subsets respectively correspond to K candidate time-length subsets, the lengths of time intervals between candidate time-instants in any one of the K candidate time-instant subsets and the first reference time-instant constitute a candidate time-length subset of the K candidate time-length subsets corresponding to the any one of the K candidate time-instant subsets; and the first information in the disclosure is used to indicate the K candidate time-length subsets in the first candidate time-length set.

In one embodiment, a length of a time interval between any one candidate time-instant within the K candidate time-instant subsets and a first reference time-instant belongs to a first candidate time-length set, the K candidate time-instant subsets respectively correspond to K candidate time-length subsets, the lengths of time intervals between candidate time-instants in any one of the K candidate time-instant subsets and the first reference time-instant constitute a candidate time-length subset of the K candidate time-length subsets corresponding to the any one of the K candidate time-instant subsets; the first information in the disclosure is used to indicate the K candidate time-length subsets in the first candidate time-length set; at least one of {an amount of candidate time lengths in the first candidate time-length set, the distribution of candidate time lengths in the first candidate time-length set} is related to a subcarrier spacing of a subcarrier included in frequency domain resources occupied by the first radio signal.

In one embodiment, the first radio signal successively occupies a part of a multi-carrier symbol and a positive integer number of complete multi-carrier symbol(s) in time domain, and the signal transmitted in the part of the multi-carrier symbol occupied by the first radio signal is a cyclic extension of the signal transmitted in the earliest complete multi-carrier symbol occupied by the first radio signal.

Embodiment 7

Embodiment 7 is a schematic diagram illustrating a relationship between K candidate time-instant subsets and K candidate time-length subsets according to an embodiment of the disclosure, as shown in FIG. 7. In FIG. 7, the first column represents a candidate time-instant subset, the second column represents a candidate time-length subset, the third column represents a first reference time-instant, and the fourth column represents a first candidate time-length set.

In Embodiment 7, a length of a time interval between any one candidate time-instant within the K candidate time-instant subsets and a first reference time-instant in the disclosure belongs to a first candidate time-length set, the K candidate time-instant subsets respectively correspond to K candidate time-length subsets, the lengths of time intervals between candidate time-instants in any one of the K candidate time-instant subsets and the first reference time-instant constitute a candidate time-length subset of the K candidate time-length subsets corresponding to the any one of the K candidate time-instant subsets; and the first information in the disclosure is used to indicate the K candidate time-length subsets in the first candidate time-length set.

In one embodiment, the first reference time-instant is configurable.

In one embodiment, the first reference time-instant is a boundary of a slot.

In one embodiment, the first reference time-instant is a boundary of one subframe.

In one embodiment, the first reference time-instant is a boundary of a sub-slot.

In one embodiment, the first reference time-instant is one of possible starting time-instants of a scheduling-based uplink transmission in an unlicensed spectrum.

In one embodiment, the first candidate time-length set includes a positive integer number of time lengths.

In one embodiment, the first candidate time-length set includes more than one time length.

In one embodiment, each candidate time length of the first candidate time-length sets is greater than zero.

In one embodiment, each candidate time length of the first candidate time-length sets is not less than zero.

In one embodiment, one candidate time length of the first candidate time-length sets is equal to zero.

In one embodiment, each candidate time length of the first candidate time-length sets has a unit of microseconds (µs).

In one embodiment, each candidate time length of the first candidate time-length sets has the same unit.

In one embodiment, two candidate time lengths of the first candidate time-length sets have different units.

In one embodiment, one candidate time length of the first candidate time-length sets has a unit of Orthogonal Frequency Division Multiplexing (OFDM) symbol number.

In one embodiment, one candidate time length of the first candidate time-length sets has a unit of Discrete Fourier Transform-Spread Orthogonal Frequency Division Multiplexing (DFT-s-OFDM) symbol number.

In one embodiment, the first information is used to indicate the K candidate time-length subsets in the first candidate time-length set, indicating that: the first information is used to directly indicate the K candidate time-length subsets in the first candidate time-length set In one embodiment, the first information is used to indicate the K candidate time-length subsets in the first candidate time-length set, indicating that: the first information is used to indirectly indicate the K candidate time-length subsets in the first candidate time-length set In one embodiment, the first information is used to indicate the K candidate time-length subsets in the first candidate time-length set, indicating that: the first information is used to explicitly indicate the K candidate time-length subsets in the first candidate time-length set In one embodiment, the first information is used to indicate the K candidate time-length subsets in the first candidate time-length set, indicating that: the first information is used to implicitly indicate the K candidate time-length subsets in the first candidate time-length set In one embodiment, the first information is used to determine the K candidate time-length subsets, indicating that: the first information is used to indicate the K candidate time-length subsets in the first candidate time-length set, so as to determine the K candidate time-instant subsets corresponding to the K candidate time-length sub sets.

Embodiment 8

Embodiment 8 is a schematic diagram illustrating a relationship between a first candidate time-length set and a subcarrier spacing of a subcarrier included in frequency domain resources occupied by a first radio signal according to an embodiment of the disclosure, as shown in FIG. 8. In FIG. 8, the first column represents whether the time domain resources occupied by the first radio signal are in the Maximum Channel Occupation Time (MCOT) of the receiver of the first radio signal, the second column represents a subcarrier spacing of a subcarrier included in the frequency domain resources occupied by the first radio signal, and the third column represents the first candidate time-length set.

In Embodiment 8, at least one of {an amount of candidate time lengths in the first candidate time-length set in the disclosure, the distribution of candidate time lengths in the first candidate time-length set} is related to a subcarrier spacing of a subcarrier included in frequency domain resources occupied by the first radio signal in the disclosure.

In one embodiment, at least one of {an amount of candidate time lengths in the first candidate time-length set in the disclosure, the distribution of candidate time lengths in the first candidate time-length set} is further related to whether the time domain resources occupied by the first radio signal are included in the Maximum Channel Occupation Time (MCOT) of the receiver of the first radio signal.

In one embodiment, an amount of candidate time lengths in the first candidate time-length set is a positive integer greater than 1.

In one embodiment, the distribution of candidate time lengths in the first candidate time-length set comprises a difference between any two candidate time lengths in the first candidate time-length set.

In one embodiment, the distribution of candidate time lengths in the first candidate time-length set comprises a pattern of time length dimensions of candidate time lengths in the first candidate time-length set.

In one embodiment, at least one of {an amount of candidate time lengths in the first candidate time-length set, the distribution of candidate time lengths in the first candidate time-length set} is related to a subcarrier spacing of a subcarrier included in frequency domain resources occupied by the first radio signal, indicating that: a subcarrier spacing of a subcarrier included in frequency domain resources occupied by the first radio signal is used by the first-type communication node to determine at least one of {an amount of candidate time lengths in the first candidate time-length set, the distribution of candidate time lengths in the first candidate time-length set}.

In one embodiment, at least one of {an amount of candidate time lengths in the first candidate time-length set, the distribution of candidate time lengths in the first candidate time-length set} is related to a subcarrier spacing of a subcarrier included in frequency domain resources occupied by the first radio signal, indicating that: at least one of {an amount of candidate time lengths in the first candidate time-length set, the distribution of candidate time lengths in the first candidate time-length set} varies with the subcarrier spacing between the subcarriers included in the frequency domain resources occupied by the first radio signal.

In one embodiment, at least one of {an amount of candidate time lengths in the first candidate time-length set, the distribution of candidate time lengths in the first candidate time-length set} is related to a subcarrier spacing of a subcarrier included in frequency domain resources occupied by the first radio signal, indicating that: at least one of {an amount of candidate time lengths in the first candidate time-length set, the distribution of candidate time lengths in the first candidate time-length set} has a specific mapping relationship with the subcarrier spacing between the subcarriers included in the frequency domain resources occupied by the first radio signal.

In one embodiment, the subcarrier spacing between the subcarriers included in the frequency domain resources occupied by the first radio signal is equal to one of {15 kHz, 30 kHz, 60 kHz, 120 kHz, 240 kHz, 480 kHz, 960 kHz, 1.92 MHz}.

In one embodiment, when the subcarrier spacing between the subcarriers included in the frequency domain resources occupied by the first radio signal is equal to 15 kHz, the first candidate time-length set is {16 μs, 25 μs, 34 μs, 43 μs, 52 μs, 61 μs, 1 OFDM or DFT-s-OFDM symbols (15 kHz subcarrier spacing)}.

In one embodiment, when the subcarrier spacing between the subcarriers included in the frequency domain resources occupied by the first radio signal is equal to 30 kHz, the first candidate time-length set is {16 μs, 25 μs, 1 OFDM or DFT-s-OFDM symbols (30 kHz subcarrier spacing), 1 OFDM or DFT-s-OFDM symbols (30 kHz subcarrier spacing)+9 μs, 1 OFDM or DFT-s-OFDM symbols (30 kHz subcarrier spacing)+18 μs, 1 OFDM or DFT-s-OFDM symbols (30 kHz subcarrier spacing)+27 μs, 2 OFDMs or DFT-s-OFDM symbols (30 kHz subcarrier spacing)}.

In one embodiment, when the subcarrier spacing between the subcarriers included in the frequency domain resources occupied by the first radio signal is equal to 30 kHz, the first candidate time-length set is {16 μs, 25 μs, 1 OFDM or DFT-s-OFDM symbols (30 kHz subcarrier spacing), 1 OFDM or DFT-s-OFDM symbols (30 kHz subcarrier spacing)+9 μs, 1 OFDM or DFT-s-OFDM symbols (30 kHz subcarrier spacing)+18 μs, 2 OFDMs or DFT-s-OFDM symbols (30 kHz subcarrier spacing)}.

In one embodiment, when the subcarrier spacing between the subcarriers included in the frequency domain resources occupied by the first radio signal is equal to 15 kHz, the first candidate time-length set is {34 μs, 43 μs, 52 μs, 61 μs, 1 OFDM or DFT-s-OFDM symbols (15 kHz subcarrier spacing)}.

In one embodiment, when the subcarrier spacing between the subcarriers included in the frequency domain resources occupied by the first radio signal is equal to 30 kHz, the first candidate time-length set is {1 OFDM or DFT-s-OFDM symbols (30 kHz subcarrier spacing), 1 OFDM or DFT-s-OFDM symbols (30 kHz subcarrier spacing)+9 μs, 1 OFDM or DFT-s-OFDM symbols (30 kHz subcarrier spacing)+18 μs, 1 OFDM or DFT-s-OFDM symbols (30 kHz subcarrier spacing)+27 μs, 2 OFDMs or DFT-s-OFDM symbols (30 kHz subcarrier spacing)}.

In one embodiment, when the subcarrier spacing between the subcarriers included in the frequency domain resources occupied by the first radio signal is equal to 30 kHz, the first candidate time-length set is {1 OFDM or DFT-s-OFDM symbols (30 kHz subcarrier spacing), 1 OFDM or DFT-s-OFDM symbols (30 kHz subcarrier spacing)+9 μs, 1 OFDM or DFT-s-OFDM symbols (30 kHz subcarrier spacing)+18 μs, 2 OFDMs or DFT-s-OFDM symbols (30 kHz subcarrier spacing)}.

Embodiment 9

Figure 9:
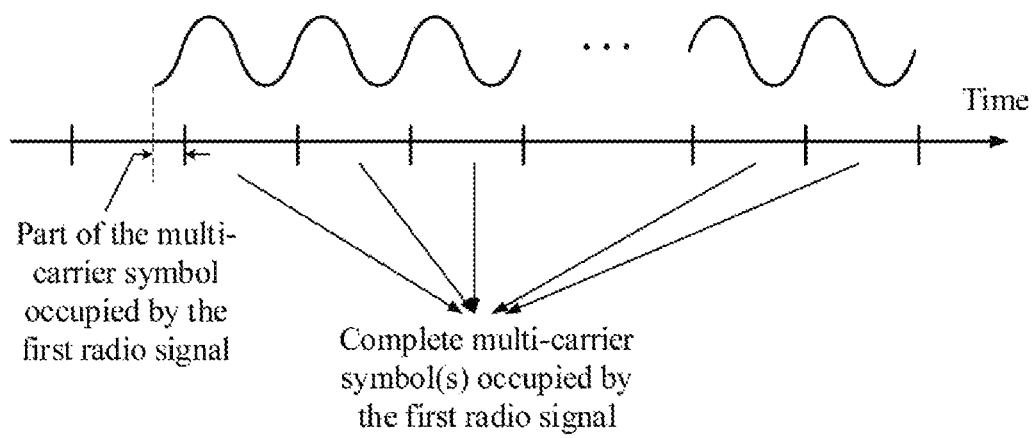
FIG. 9 is a schematic diagram illustrating a first radio signal according to an embodiment of the disclosure.

Embodiment 9 is a schematic diagram illustrating a first radio signal according to an embodiment of the disclosure, as shown in FIG. 9. In FIG. 9, the horizontal axis represents time, and each grid on the time axis represents a multi-carrier symbol.

In Embodiment 9, the first radio signal in the disclosure successively occupies a part of a multi-carrier symbol and a positive integer number of complete multi-carrier symbol(s) in time domain, and the signal transmitted in the part of the multi-carrier symbol occupied by the first radio signal is a cyclic extension of the signal transmitted in the earliest complete multi-carrier symbol occupied by the first radio signal.

In one embodiment, a part of the multi-carrier symbol and a positive integer number of complete multi-carrier symbol(s) occupied by the first radio signal in time domain are continuous in time domain.

In one embodiment, the time length of a part of the multi-carrier symbol occupied by the first radio signal in time domain is related to a subcarrier spacing of a subcarrier in the frequency domain occupied by the first radio signal.

In one embodiment, the number of complete multi-carrier symbol(s) occupied by the first radio signal in time domain is related to a subcarrier spacing of a subcarrier in the frequency domain occupied by the first radio signal.

In one embodiment, the signal transmitted in the part of the multi-carrier symbol occupied by the first radio signal is a cyclic extension of the signal transmitted in the earliest complete multi-carrier symbol occupied by the first radio signal, which is implemented by:

$$s_i^{(p)}(t) = \begin{cases} 0 & 0 \leq t < N_{start}^{FS3} T_s \\ -s_{i+1}^{(p)}(t - N_{CP,i}T_s) & N_{start}^{FS3} T_s \leq t < (N_{CP,i} + N)T_s \end{cases}$$

Where $s_i^{(p)}(t)$ represents a signal transmitted in the multi-carrier symbol to which the part of the multi-carrier symbol occupied by the first radio signal belongs, $s_{i+1}^{(p)}(t)$ represents a signal transmitted in the earliest complete multi-carrier symbol occupied by the first radio signal, $N_{start}^{FS3}$ represents the position in the multi-carrier symbol to which the part of the multi-carrier symbol occupied by the first radio signal belongs in the first time-instant, $N_{CP,i}$ represents the length of the CP in the multi-carrier symbol to which the part of the multi-carrier symbol occupied by the first radio signal belongs, and $T_s$ represents the use of the time interval.

Embodiment 10

Figure 10:
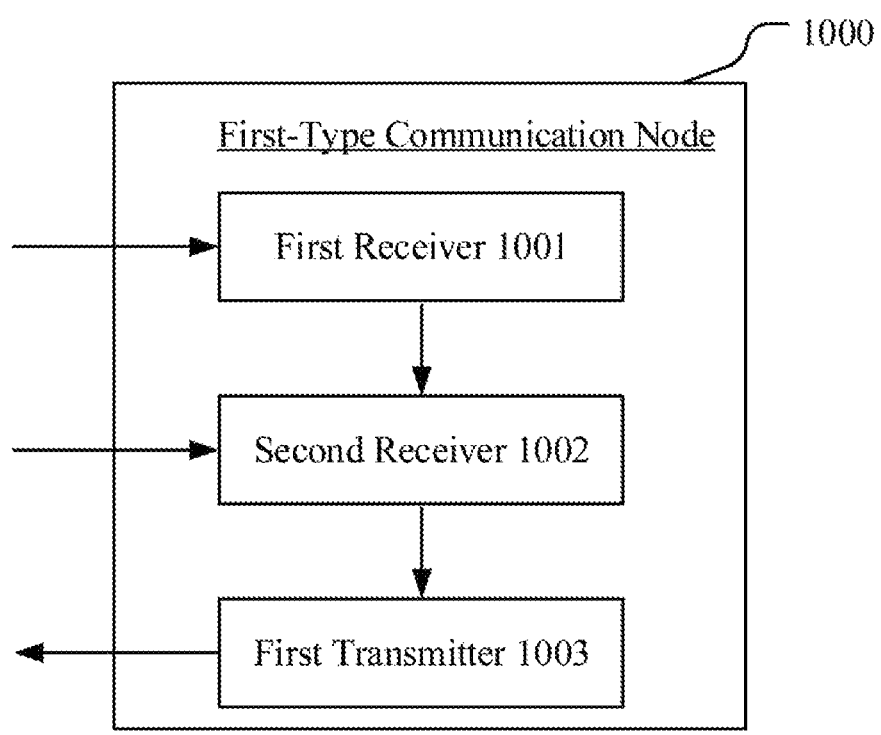
FIG. 10 is a block diagram illustrating the structure of a processing device of the first-type communication node device according to an embodiment of the disclosure.

Embodiment 10 is a block diagram illustrating the structure of a processing device of the first-type communication node device according to an embodiment of the disclosure, as shown in FIG. 10. In FIG. 10, the processing device 1000 of the first-type communication node device comprises a first receiver 1001, a second receiver 1002, and a first transmitter 1003. The first receiver 1001 comprises a transmitter/receiver 456 (including an antenna 460), a receiving processor 452 and a controller/processor 490 in FIG. 4 of the disclosure; the second receiver 1002 includes a transmitter/receiver 456 (including an antenna 460) and a receiving processor 452 in FIG. 4 of the disclosure; the first transmitter 1003 includes a transmitter/receiver 456 (including an antenna 460), a transmitting processor 455 and a controller/processor 490 in FIG. 4 of the disclosure.

In Embodiment 10, the first receiver 1001 receives the first information; the second receiver 1002 performs Q energy detections respectively in Q time sub-pools within a first sub-band, wherein the Q is a positive integer greater than 1; if the energy detected by each energy detection of the Q energy detections is lower than a first threshold, the first transmitter 1003 starts to transmit a first radio signal at a first time-instant; wherein the first information is used to determine K candidate time-instant subsets, each candidate time-instant subset of the K candidate time-instant subsets comprises a positive integer number of candidate time-instants, the K is a positive integer greater than 1; a target time-instant subset is one of the K candidate time-instant subsets, the first time-instant belongs to the target time-instant subset; a frequency domain bandwidth of the first sub-band is used to determine the target time-instant subset out of the K candidate time-instant subsets, the frequency domain resources occupied by the first radio signal belong to the first sub-band; the first information is transmitted through an air interface.

In one embodiment, the first receiver 1001 receives second information; wherein the second information is used to determine a frequency domain bandwidth of the first sub-band, and the second information is transmitted through the air interface.

In one embodiment, a length of a time interval between any one candidate time-instant within the K candidate time-instant subsets and a first reference time-instant belongs to a first candidate time-length set, the K candidate time-instant subsets respectively correspond to K candidate time-length subsets, the lengths of time intervals between candidate time-instants in any one of the K candidate time-instant subsets and the first reference time-instant constitute a candidate time-length subset of the K candidate time-length subsets corresponding to the any one of the K candidate time-instant subsets; and the first information is used to indicate the K candidate time-length subsets in the first candidate time-length set.

In one embodiment, a length of a time interval between any one candidate time-instant within the K candidate time-instant subsets and a first reference time-instant belongs to a first candidate time-length set, the K candidate time-instant subsets respectively correspond to K candidate time-length subsets, the lengths of time intervals between candidate time-instants in any one of the K candidate time-instant subsets and the first reference time-instant constitute a candidate time-length subset of the K candidate time-length subsets corresponding to the any one of the K candidate time-instant subsets; and the first information is used to indicate the K candidate time-length subsets in the first candidate time-length set; at least one of {an amount of candidate time lengths in the first candidate time-length set, the distribution of candidate time lengths in the first candidate time-length set} is related to a subcarrier spacing of a subcarrier included in frequency domain resources occupied by the first radio signal.

In one embodiment, the first receiver 1001 receives a first signaling; wherein the first signaling is used to determine at least one of {frequency domain resources occupied by the first radio signal, time domain resources occupied by the first radio signal}, and the first signaling is transmitted through the air interface;

In one embodiment, the first radio signal successively occupies a part of a multi-carrier symbol and a positive integer number of complete multi-carrier symbol(s) in time domain, and the signal transmitted in the part of the multi-carrier symbol occupied by the first radio signal is a cyclic extension of the signal transmitted in the earliest complete multi-carrier symbol occupied by the first radio signal.

Embodiment 11

Figure 11:
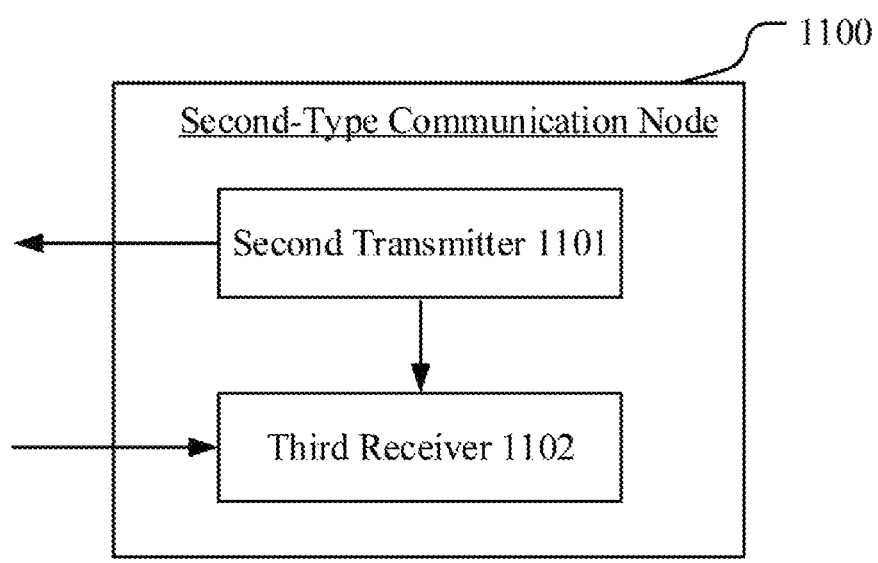
FIG. 11 is a block diagram illustrating the structure of a processing device of the second-type communication node device according to an embodiment of the disclosure.

Embodiment 11 is a block diagram illustrating the structure of a processing device of the second-type communication node device according to an embodiment of the disclosure, as shown in FIG. 11. In FIG. 11, the processing device 1110 of the second-type communication node device comprises a second transmitter 1101 and a third receiver 1102. The second transmitter 1101 comprises a transmitter/receiver 416 (including an antenna 420), a transmitting processor 415 and a controller/processor 440 in FIG. 4 of the disclosure; the third receiver 1102 comprises a transmitter/ receiver 416 (including an antenna 420), a receiving processor 412 and a controller/processor 440 in FIG. 4 of the disclosure.

In Embodiment 11, the second transmitter 1101 transmits the first information; the third receiver 1102 receives the first radio signal; wherein the first information is used to determine K candidate time-instant subsets, each candidate time-instant subset of the K candidate time-instant subsets comprises a positive integer number of candidate time-instants, the K is a positive integer greater than 1; a target time-instant subset is one of the K candidate time-instant subsets, the transmission starting time-instant of the first radio signal is a first time-instant, the first time-instant belongs to the target time-instant subset; a frequency domain bandwidth of the first sub-band is used to determine the target time-instant subset out of the K candidate time-instant subsets, the frequency domain resources occupied by the first radio signal belong to the first sub-band; the first information is transmitted through an air interface.

In one embodiment, the second transmitter 1101 transmits second information; wherein the second information is used to determine a frequency domain bandwidth of the first sub-band, and the second information is transmitted through the air interface.

In one embodiment, a length of a time interval between any one candidate time-instant within the K candidate time-instant subsets and a first reference time-instant belongs to a first candidate time-length set, the K candidate time-instant subsets respectively correspond to K candidate time-length subsets, the lengths of time intervals between candidate time-instants in any one of the K candidate time-instant subsets and the first reference time-instant constitute a candidate time-length subset of the K candidate time-length subsets corresponding to the any one of the K candidate time-instant subsets; and the first information is used to indicate the K candidate time-length subsets in the first candidate time-length set.

In one embodiment, a length of a time interval between any one candidate time-instant within the K candidate time-instant subsets and a first reference time-instant belongs to a first candidate time-length set, the K candidate time-instant subsets respectively correspond to K candidate time-length subsets, the lengths of time intervals between candidate time-instants in any one of the K candidate time-instant subsets and the first reference time-instant constitute a candidate time-length subset of the K candidate time-length subsets corresponding to the any one of the K candidate time-instant subsets; and the first information is used to indicate the K candidate time-length subsets in the first candidate time-length set; at least one of {an amount of candidate time lengths in the first candidate time-length set, the distribution of candidate time lengths in the first candidate time-length set} is related to a subcarrier spacing of a subcarrier included in frequency domain resources occupied by the first radio signal.

In one embodiment, the second transmitter 1101 transmits a first signaling; wherein the first signaling is used to determine at least one of {frequency domain resources occupied by the first radio signal, time domain resources occupied by the first radio signal}, and the first signaling is transmitted through the air interface;

In one embodiment, the first radio signal successively occupies a part of a multi-carrier symbol and a positive integer number of complete multi-carrier symbol(s) in time domain, and the signal transmitted in the part of the multi-carrier symbol occupied by the first radio signal is a cyclic extension of the signal transmitted in the earliest complete multi-carrier symbol occupied by the first radio signal.

The ordinary skill in the art may understand that all or part steps in the above method may be implemented by instructing related hardware through a program. The program may be stored in a computer-readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The first-type communication node device, UE or terminal in the disclosure include but not limited to mobile phones, tablet computers, notebooks, network cards, low power consumption devices, eMTC devices, NB-IoT devices, in-vehicle communication devices, and other radio communication devices. The second-type communication node device, base station or network side device in the disclosure includes but not limited to macro-cellular base stations, micro-cellular base stations, home base stations, relay base stations, eNB, gNB, transmission receiving nodes TRP, and other radio communication devices.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a first-type communication node for wireless communication, comprising:
   receiving first information;
   performing Q energy detections respectively in Q time sub-pools within a first sub-band, wherein the Q is a positive integer greater than 1; and
   if energy detected by each energy detection of the Q energy detections is lower than a first threshold, starting to transmit a first radio signal at a first time-instant;
   wherein the first information is used to determine K candidate time-instant subsets, each candidate time-instant subset of the K candidate time-instant subsets comprises a positive integer number of candidate time-instant(s), the K is a positive integer greater than 1; a target time-instant subset is one of the K candidate time-instant subsets, the first time-instant belongs to the target time-instant subset; a frequency-domain bandwidth of the first sub-band is used to determine the target time-instant subset out of the K candidate time-instant subsets, the frequency-domain resources occupied by the first radio signal belong to the first sub-band; the first information is transmitted through an air interface; and the first radio signal successively occupies a part of a multi-carrier symbol and a positive integer number of complete multi-carrier symbol(s) in the time domain, and a signal transmitted in the part of the multi-carrier symbol occupied by the first radio signal is a cyclic extension of a signal transmitted in an earliest complete multi-carrier symbol occupied by the first radio signal.

2. The method according to claim 1, further comprising:
   receiving second information;
   wherein the second information is used to determine a frequency-domain bandwidth of the first sub-band, and the second information is transmitted through the air interface.

3. The method according to claim 1, wherein a length of a time interval between one candidate time-instant within the K candidate time-instant subsets and a first reference time-instant belongs to a first candidate time-length set, the K candidate time-instant subsets respectively correspond to K candidate time-length subsets, lengths of time intervals between candidate time-instants in any one of the K candidate time-instant subsets and the first reference time-instant constitute a candidate time-length subset of the K candidate time-length subsets corresponding to the any one of the K candidate time-instant subsets; and the first information is used to indicate the K candidate time-length subsets in the first candidate time-length set.

4. The method according to claim 3, wherein at least one of an amount of candidate time lengths in the first candidate time-length set or a distribution of candidate time lengths in the first candidate time-length set is related to a subcarrier spacing of a subcarrier included in frequency-domain resources occupied by the first radio signal.

5. The method according to claim 1, further comprising:
receiving a first signaling;
wherein the first signaling is used to determine at least one of frequency-domain resources occupied by the first radio signal or time-domain resources occupied by the first radio signal, and the first signaling is transmitted through the air interface.

6. A method in a second-type communication node for wireless communication, comprising:
transmitting first information; and
receiving a first radio signal;
wherein the first information is used to determine K candidate time-instant subsets, each candidate time-instant subset of the K candidate time-instant subsets comprises a positive integer number of candidate time-instant(s), the K is a positive integer greater than 1; a target time-instant subset is one of the K candidate time-instant subsets, a starting time-instant of transmitting the first radio signal is a first time-instant, the first time-instant belongs to the target time-instant subset; a frequency-domain bandwidth of a first sub-band is used to determine the target time-instant subset out of the K candidate time-instant subsets, frequency-domain resources occupied by the first radio signal belong to the first sub-band; the first information is transmitted through an air interface; and the first radio signal successively occupies a part of a multi-carrier symbol and a positive integer number of complete multi-carrier symbol(s) in the time domain, and a signal transmitted in the part of the multi-carrier symbol occupied by the first radio signal is a cyclic extension of a signal transmitted in an earliest complete multi-carrier symbol occupied by the first radio signal.

7. The method according to claim 6, further comprising:
transmitting second information;
wherein the second information is used to determine a frequency-domain bandwidth of the first sub-band, and the second information is transmitted through the air interface.

8. The method according to claim 6, wherein a length of a time interval between one candidate time-instant within the K candidate time-instant subsets and a first reference time-instant belongs to a first candidate time-length set, the K candidate time-instant subsets respectively correspond to K candidate time-length subsets, lengths of time intervals respectively between candidate time-instants in any one of the K candidate time-instant subsets and the first reference time-instant constitute a candidate time-length subset of the K candidate time-length subsets corresponding to the any one of the K candidate time-instant subsets;
and the first information is used to indicate the K candidate time-length subsets in the first candidate time-length set.

9. The method according to claim 8, wherein at least one of an amount of candidate time lengths in the first candidate time-length set or a distribution of candidate time lengths in the first candidate time-length set is related to a subcarrier spacing of a subcarrier included in frequency-domain resources occupied by the first radio signal.

10. The method according to claim 6, further comprising:
transmitting a first signaling;
wherein the first signaling is used to determine at least one of frequency-domain resources occupied by the first radio signal or time-domain resources occupied by the first radio signal, and the first signaling is transmitted through the air interface.

11. A first-type communication node device for wireless communication, comprising:
a first receiver, to receive first information;
a second receiver, to perform Q energy detections respectively in Q time sub-pools within a first sub-band, wherein the Q is a positive integer greater than 1; and
a first transmitter, if energy detected by each energy detection of the Q energy detections is lower than a first threshold, to start to transmit a first radio signal at a first time-instant;
wherein the first information is used to determine K candidate time-instant subsets, each candidate time-instant subset of the K candidate time-instant subsets comprises a positive integer number of candidate time-instant(s), the K is a positive integer greater than 1; a target time-instant subset is one of the K candidate time-instant subsets, the first time-instant belongs to the target time-instant subset; a frequency-domain bandwidth of the first sub-band is used to determine the target time-instant subset out of the K candidate time-instant subsets, the frequency-domain resources occupied by the first radio signal belong to the first sub-band; the first information is transmitted through an air interface; and the first radio signal successively occupies a part of a multi-carrier symbol and a positive integer number of complete multi-carrier symbol(s) in the time domain, and a signal transmitted in the part of the multi-carrier symbol occupied by the first radio signal is a cyclic extension of a signal transmitted in an earliest complete multi-carrier symbol occupied by the first radio signal.

12. The first-type communication node device according to claim 11, wherein the first receiver receives second information; wherein the second information is used to determine a frequency-domain bandwidth of the first sub-band, and the second information is transmitted through the air interface.

13. The first-type communication node device according to claim 11, wherein a length of a time interval between one candidate time-instant within the K candidate time-instant subsets and a first reference time-instant belongs to a first candidate time-length set, the K candidate time-instant subsets respectively correspond to K candidate time-length subsets, lengths of time intervals respectively between candidate time-instants in any one of the K candidate time-instant subsets and the first reference time-instant constitute a candidate time-length subset of the K candidate time-length subsets corresponding to the any one of the K candidate time-instant subsets; and the first information is used to indicate the K candidate time-length subsets in the first candidate time-length set.

14. The first-type communication node device according to claim 13, wherein at least one of an amount of candidate time lengths in the first candidate time-length set or a distribution of candidate time lengths in the first candidate time-length set is related to a subcarrier spacing of a subcarrier included in frequency-domain resources occupied by the first radio signal.

15. The first-type communication node device according to claim 11, wherein the first receiver receives a first signaling; wherein the first signaling is used to determine at least one of frequency-domain resources occupied by the first radio signal or time-domain resources occupied by the first radio signal, and the first signaling is transmitted through the air interface.

16. A second-type communication node device for wireless communication, comprising:
a second transmitter, to transmit first information; and
a third receiver, to receive a first radio signal;
wherein the first information is used to determine K candidate time-instant subsets, each candidate time-instant subset of the K candidate time-instant subsets comprises a positive integer number of candidate time-instant(s), the K is a positive integer greater than 1; a target time-instant subset is one of the K candidate time-instant subsets, a starting time-instant of transmitting the first radio signal is a first time-instant, the first time-instant belongs to the target time-instant subset; a frequency-domain bandwidth of a first sub-band is used to determine the target time-instant subset out of the K candidate time-instant subsets, frequency-domain resources occupied by the first radio signal belong to the first sub-band; the first information is transmitted through an air interface; and the first radio signal successively occupies a part of a multi-carrier symbol and a positive integer number of complete multi-carrier symbol(s) in the time domain, and a signal transmitted in the part of the multi-carrier symbol occupied by the first radio signal is a cyclic extension of a signal transmitted in an earliest complete multi-carrier symbol occupied by the first radio signal.

17. The second-type communication node device according to claim 16, wherein the second transmitter transmits second information; wherein the second information is used to determine a frequency-domain bandwidth of the first sub-band, and the second information is transmitted through the air interface.

18. The second-type communication node device according to claim 16, wherein a length of a time interval between one candidate time-instant within the K candidate time-instant subsets and a first reference time-instant belongs to a first candidate time-length set, the K candidate time-instant subsets respectively correspond to K candidate time-length subsets, lengths of time intervals respectively between candidate time-instants in any one of the K candidate time-instant subsets and the first reference time-instant constitute a candidate time-length subset of the K candidate time-length subsets corresponding to the any one of the K candidate time-instant subsets; and the first information is used to indicate the K candidate time-length subsets in the first candidate time-length set.

19. The second-type communication node device according to claim 18, wherein at least one of an amount of candidate time lengths in the first candidate time-length set or a distribution of candidate time lengths in the first candidate time-length set is related to a subcarrier spacing of a subcarrier included in frequency-domain resources occupied by the first radio signal.

20. The second-type communication node device according to claim 16, wherein the second transmitter transmits a first signaling; wherein the first signaling is used to determine at least one of frequency-domain resources occupied by the first radio signal or time-domain resources occupied by the first radio signal, and the first signaling is transmitted through the air interface.

* * * * *